United States Patent
Fahimi et al.

(10) Patent No.: US 8,314,576 B2
(45) Date of Patent: Nov. 20, 2012

(54) METHODS AND APPARATUSES FOR FAULT MANAGEMENT IN PERMANENT MAGNET SYNCHRONOUS MACHINES USING THE FIELD RECONSTRUCTION METHOD

(75) Inventors: Babak Fahimi, Arlington, TX (US); Amir Khoobroo, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 255 days.

(21) Appl. No.: 12/838,442

(22) Filed: Jul. 17, 2010

(65) Prior Publication Data
US 2012/0074879 A1  Mar. 29, 2012

Related U.S. Application Data

(60) Provisional application No. 61/226,667, filed on Jul. 17, 2009.

(51) Int. Cl.
*H02P 6/12* (2006.01)
*H02P 23/14* (2006.01)

(52) U.S. Cl. ............... 318/400.21; 318/400.04; 318/700

(58) Field of Classification Search ............. 318/400.01, 318/400.04, 400.06, 400.21, 700, 687, 153, 318/135; 322/29
See application file for complete search history.

(56) References Cited

U.S. PATENT DOCUMENTS

| | | | | |
|---|---|---|---|---|
| 7,567,596 | B2 * | 7/2009 | Dantus et al. | 372/30 |
| 7,609,731 | B2 * | 10/2009 | Dantus et al. | 372/30 |
| 7,839,101 | B2 * | 11/2010 | Yu et al. | 318/135 |
| 2011/0098992 | A1 * | 4/2011 | Van Beurden et al. | 703/2 |
| 2011/0267012 | A1 * | 11/2011 | Kiani et al. | 322/29 |

* cited by examiner

*Primary Examiner* — Eduardo Colon Santana
(74) *Attorney, Agent, or Firm* — Chowdhury & Georgakis, P.C.

(57) ABSTRACT

Methods and apparatuses for detecting faults and optimizing phase currents in an electromechanical energy converter are disclosed. An example method comprises: measuring a current of a phase of the electromechanical energy converter, modeling the electromechanical energy converter with the current measurement input into a field reconstruction module, calculating a flux linkage of the electromechanical energy converter, comparing the flux linkage with a flux linkage from a no fault electromechanical energy converter, and optimizing the current of the phase of the electromechanical energy converter in response to the comparison. Other embodiments are described and claimed.

14 Claims, 32 Drawing Sheets

METHODS AND APPARATUSES FOR FAULT MANAGEMENT IN PERMANENT MAGNET SYNCHRONOUS MACHINES USING THE FIELD RECONSTRUCTION METHOD

CROSS REFERENCE TO RELATED APPLICATIONS

This application claims the benefit of the filing date of U.S. provisional patent application No. 61/226,667, incorporated herein by reference, which was filed on Jul. 17, 2009, by the same inventors of this application.

STATEMENT REGARDING FEDERALLY SPONSORED RESEARCH

This invention was made with government support under Contract Number N00014-09-1-0572 awarded by the Office of Naval Research. The government has certain rights in the invention.

FIELD OF THE INVENTION

The present invention generally relates to fault management in multi-phase permanent magnet synchronous machines. More particularly, the invention relates to fault detection and post fault treatment using the field reconstruction method.

BACKGROUND OF THE INVENTION

The embodiment described herein relates generally to the field of fault detection in permanent magnet synchronous machines (PMSM) and the subsequent management of the faults after detection. The field reconstruction method (FRM) is utilized in a magnetic flux observer system to (a) detect faults and (b) optimize the torque in a PMSM in real time.

In order to detect faults in an electromechanical energy converter, knowledge of the distribution and behavior of the magnetic field is necessary. Present tools for magnetic field analysis mainly use the finite element analysis (FEA) to find the distribution of the magnetic field in the electromechanical energy conversion unit. Although accurate, the main problem with FEA based methods is the amount of time which is necessary to carry out the task. Therefore FEA methods are inappropriate for real time control schemes. Also, FEA methods increase the computational expense of the whole system. In addition, there are issues in flux estimation using conventional methods as they use voltage integration which leads in significant numerical errors in low speed applications. One of the main areas in which the magnetic field analysis is applicable is the observation of the magnetic flux passing through the stator teeth in an electrical machine. Normally, a set of search coils are mounted on the machine to sense induced voltages. Then the data from the sensors would be fed into the DSP to be converted into corresponding flux linkage values. The magnetic flux observer method here gives the same results with acceptable accuracy while using only the phase currents. For the purpose of calibration, the estimated flux values may be compared to actual values measured using the search coils. Once the magnetic flux observer is calibrated it may be used to detect faults such as inter-turn short-circuits, rotor eccentricity, and PM demagnetization.

SUMMARY

In one respect, disclosed is an apparatus for detecting faults and optimizing phase currents in an electromechanical energy converter, the apparatus comprising: one or more processors and one or more memory units coupled to the processors. The apparatus is configured to: measure a current of a phase of the electromechanical energy converter, model the electromechanical energy converter with the current measurement input into a field reconstruction module, calculate a flux linkage of the electromechanical energy converter, compare the flux linkage with a flux linkage from a no fault electromechanical energy converter, and optimize the current of the phase of the electromechanical energy converter in response to the comparison.

In another respect, disclosed is a method for detecting faults and optimizing phase currents in an electromechanical energy converter, the method comprising: measuring a current of a phase of the electromechanical energy converter, modeling the electromechanical energy converter with the current measurement input into a field reconstruction module, calculating a flux linkage of the electromechanical energy converter, comparing the flux linkage with a flux linkage from a no fault electromechanical energy converter, and optimizing the current of the phase of the electromechanical energy converter in response to the comparison.

Numerous additional embodiments are also possible.

BRIEF DESCRIPTION OF THE DRAWINGS

Features and advantages of the present invention will become apparent from the appended claims, the following detailed description of one or more example embodiments, and the corresponding figures.

DETAILED DESCRIPTION OF ONE OR MORE EMBODIMENTS

Figure 1:
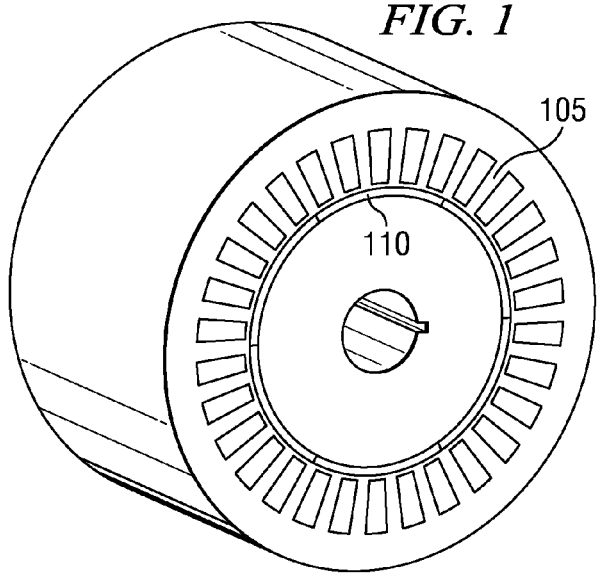
FIG. 1 is a schematic illustration of a 5-phase, 6-pole, 30 slot surface mounted permanent magnet machine, in accordance with some embodiments.

The drawing figures are not necessarily to scale and certain features may be shown exaggerated in scale or in somewhat generalized or schematic form in the interest of clarity and conciseness. In the description which follows like parts may be marked throughout the specification and drawing with the same reference numerals. The foregoing description of the figures is provided for a more complete understanding of the drawings. It should be understood, however, that the embodiments are not limited to the precise arrangements and configurations shown. Although the design and use of various embodiments are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention. It would be impossible or impractical to include all of the possible embodiments and contexts of the invention in this disclosure. Upon reading this disclosure, many alternative embodiments of the present invention will be apparent to persons of ordinary skill in the art.

Fault tolerance has become a design criterion for adjustable speed motor drives (ASMD) which are used in high impact applications. In simple terms, a fault tolerant ASMD is expected to continue its intended function in the event of a failure compliment to its remaining components. Although some ASMD such as switched reluctance motor drives enjoy an inherent modular and hence fault resilient architecture, special precautions have to be undertaken for multi-phase PMSM and induction motor (IM) drives to secure continued service. In case of a PMSM motor drive, maximum operating temperature is also limited due to the thermal limitations of the permanent magnets and stator windings. Based on this, the faults in a PMSM should be detected and cleared immediately to avoid further damage to the system. On the other hand, in some applications, the continuity of the service is of great importance so the next step would be to calculate the best excitation possible for the remaining active phases of the machine to harvest maximum torque. A wide variety of research has been done on the techniques of fault detection. Most of the research solely focuses on the fault itself rather than the aftermath. Also, most of the methods are only applicable to the specific faults on the stator windings and are not applicable to other types of faults.

After a fault is detected in a PMSM, the torque needs to be optimized in order to maximize the output torque per ampere while minimizing the torque ripple. Torque optimization of a PMSM can be achieved using conventional techniques. These conventional methods use different optimization algorithms based on magnetic field analysis resulting from finite element analysis. As the finite element procedures are time consuming, these methods are not adequate for real time control.

An alternative for real time control of fault detection and optimization of a PMSM utilizes the field reconstruction method. The FRM uses the field created by a single slot along with the field generated by the permanent magnets on the rotor to find the field distribution and electromagnetic force components for any arbitrary rotor position and excitation. FRM may be used to estimate the flux linking each stator tooth for the purpose of detecting faults. Additionally, the FRM may be used in conjunction with optimization methods to find the optimal excitation strategy for each fault which would be used after the fault is cleared.

The use of the field reconstruction method is demonstrated in a 10 hp, 5-phase, 6-pole, 30 slot surface mounted permanent magnet machine. The model of the machine is shown in FIG. 1 with one of the stator teeth 105 and one of the six poles 110 identified. The model is used to compare the results from the FRM with those from the FEA. The model is simulated using the commercial finite element package MAGNET from Infolytica Corporation. In the model, it is assumed that there are no deformations in the permanent magnets or stator teeth due to the internal forces, that the stator windings are concentrated, and that there are no end coil effects.

In order to calculate the torque, the magnetic field components need to be known. For an unsaturated PMSM, the magnetization curve can be considered to be linear and as such the superposition rule is applied to the magnetic field components as expressed in equations (1) and (2), $$B_t = B_{tpm} + B_{ts} \tag{1}$$

$$B_n = B_{npm} + B_{ns} \tag{2}$$

where $B_{npm}$, $B_{tpm}$, $B_{ns}$, and $B_{ts}$ denote the normal and tangential field components due to the permanent magnets and stator currents respectively. The resultant magnetic field created by the stator windings is the sum of the field created by each individual stator slot current. The normal and tangential field components due to the stator currents can be written as expressed in equations (3) and (4), $$B_{ns} = \sum_{k=1}^{L} B_{nsk} \tag{3}$$

$$B_{ts} = \sum_{k=1}^{L} B_{tsk} \tag{4}$$

where L denotes the number of stator teeth. In order to evaluate equations (3) and (4), the local flux densities created by the current in the $k^{th}$ slot are expressed in equations (5) and (6), $$B_{tsk}(\phi_s) = I \cdot f_1(\phi_s) \tag{5}$$

$$B_{nsk}(\phi_s) = I \cdot f_2(\phi_s) \tag{6}$$

where $f_1$ and $f_2$ are associated with the geometry. A single magneto-static FEA is needed to find these basis functions. Having these basis functions for a typical slot first carrying current $I_0$, equations (5) and (6) can be rewritten as expressed in equations (7) and (8).

$$B_{tsk} = (I/I_0) B_{ts0}(\phi - k\gamma) \tag{7}$$

$$B_{nsk} = (I/I_0) B_{ns0}(\phi - k\gamma) \tag{8}$$

Figure 2:
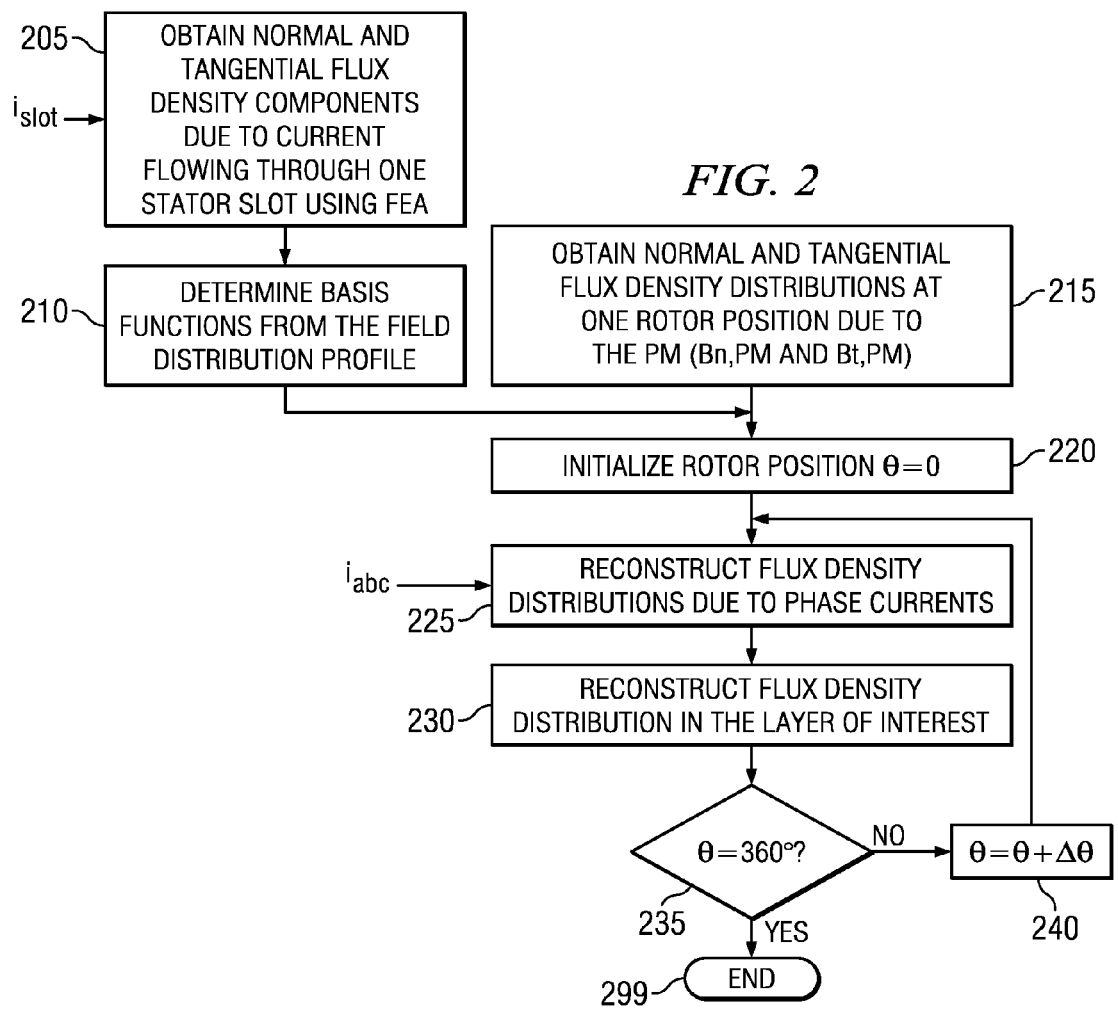
FIG. 2 is a flow diagram illustrating the field reconstruction method, in accordance with some embodiments.

Therefore by performing a single off-line FEA for a single slot contribution of the stator, the rotating field components can be calculated for any normal working condition. In the second step, the permanent magnet contribution to the magnetic field over one pole pitch is computed using an FEA analysis for the unexcited stator condition. Having these two components, the magnetic field components can be obtained in the middle of the air gap. The field reconstruction flowchart is shown in FIG. 2. Processing begins at block 205 where the normal and tangential flux density components due to the current flowing through one stator slot, $i_{slot}$, are obtained using the FEA. At block 210, the basis functions from the field distribution profile are determined. At block 215, the normal and tangential flux density distributions at one rotor position due to the permanent magnet are obtained. The rotor position is then initialized to zero at block 220. Next, at block 225, the flux density distributions due to phase currents, $i_{abc}$, are reconstructed. Then at block 230, the flux density distribution in the layer of interest is reconstructed. At decision block 235, it is checked to see if the angular position, θ, is equal to 360°. If not, then processing continues to block 240 where the angular position is incremented by Δθ. Processing then continues by repeating the loop of blocks 225, 230, and 235 until θ is equal to 360° at which point processing ends at 299.

Figure 3:
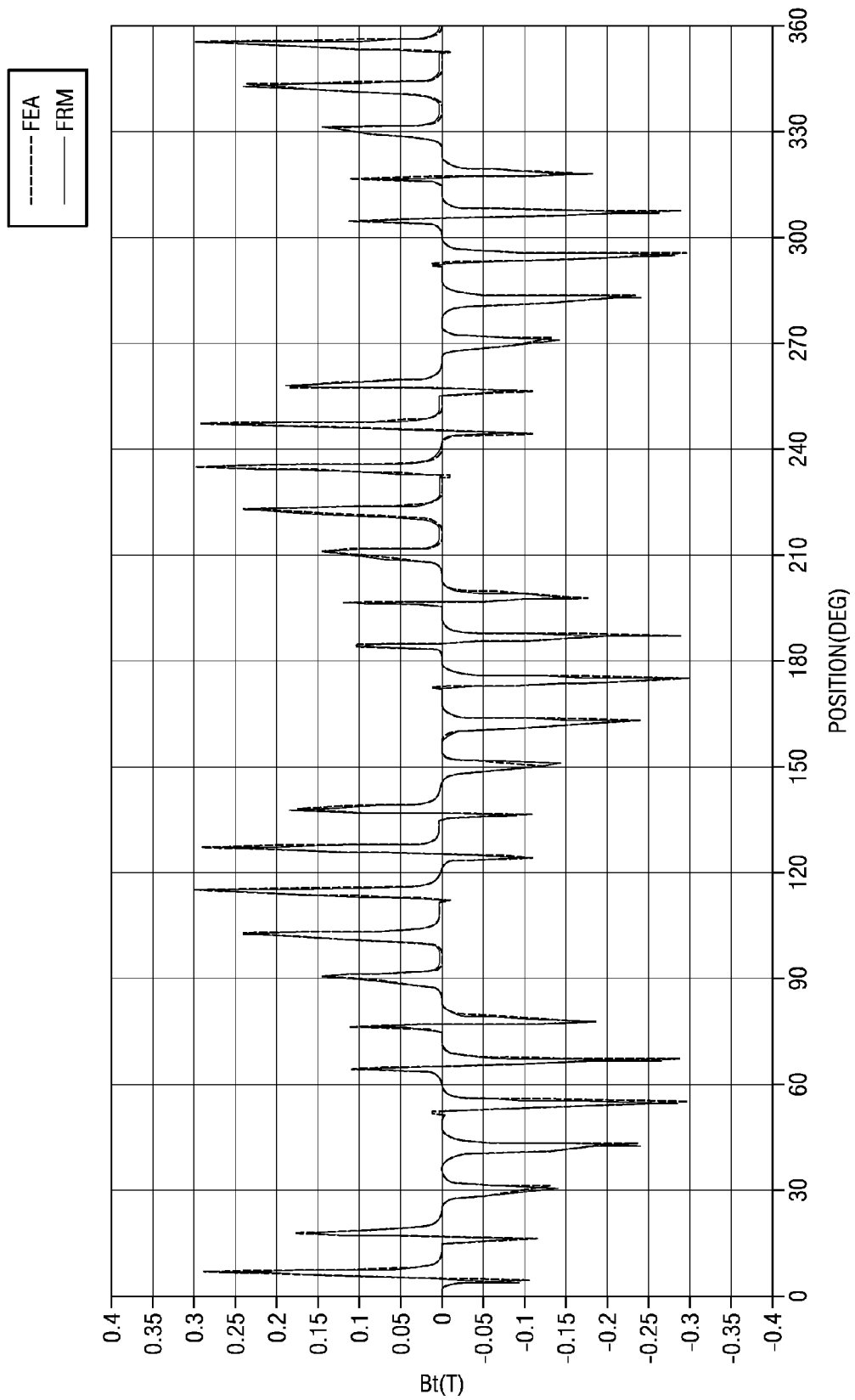
FIG. 3 is a graph depicting the tangential field components from FEA and FRM, in accordance with some embodiments.
Figure 4:
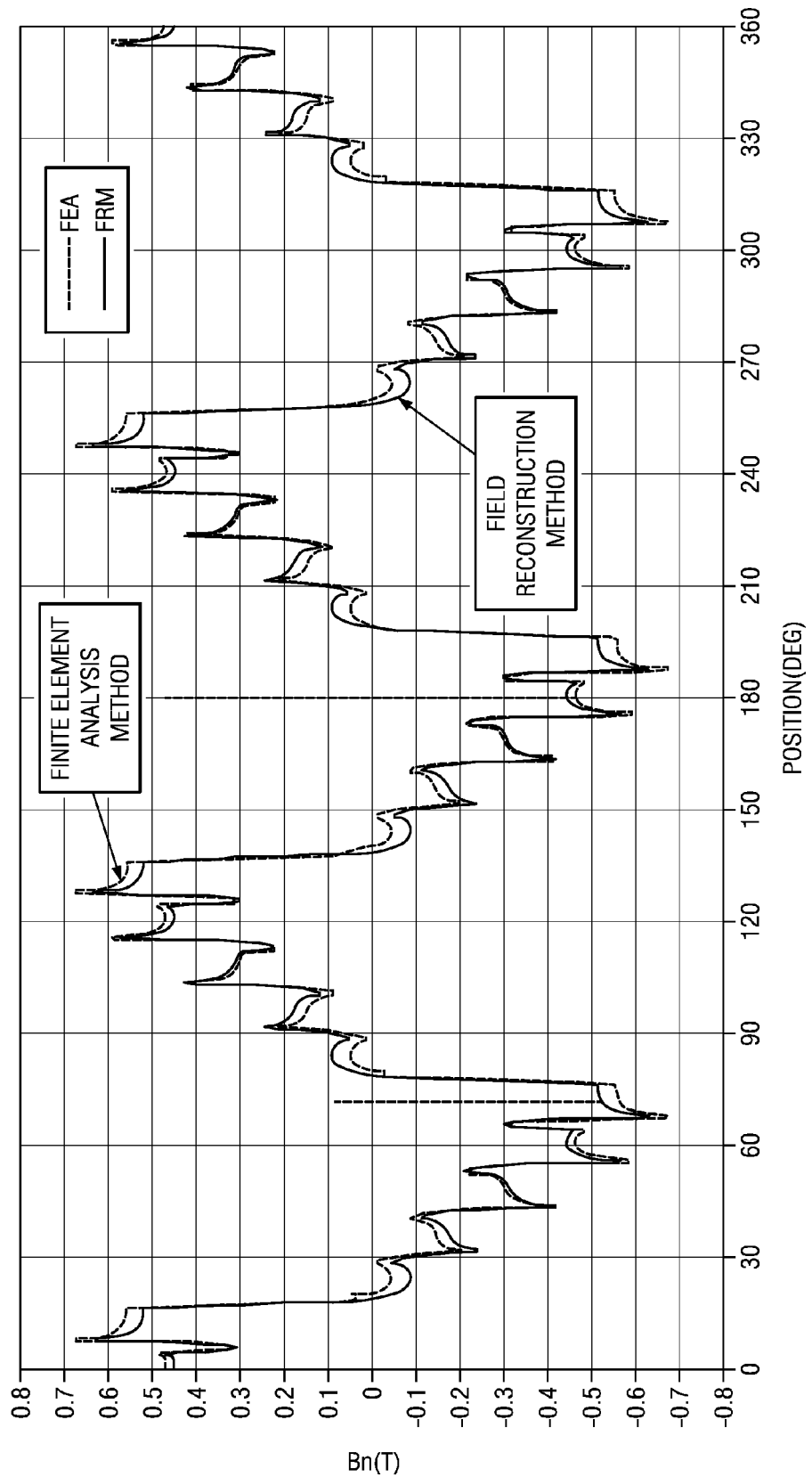
FIG. 4 is a graph depicting the normal field components from FEA and FRM, in accordance with some embodiments.

In order to verify the accuracy of this method the tangential and normal components of the magnetic field in the middle of the airgap obtained from FRM are compared to those from FEA. FIGS. 3 and 4 depict the accuracy of the tangential and normal magnetic field reconstruction method, respectively. As can be seen, the magnetic fields calculated using the FRM are very similar to those calculated using the FEA.

Figure 5:
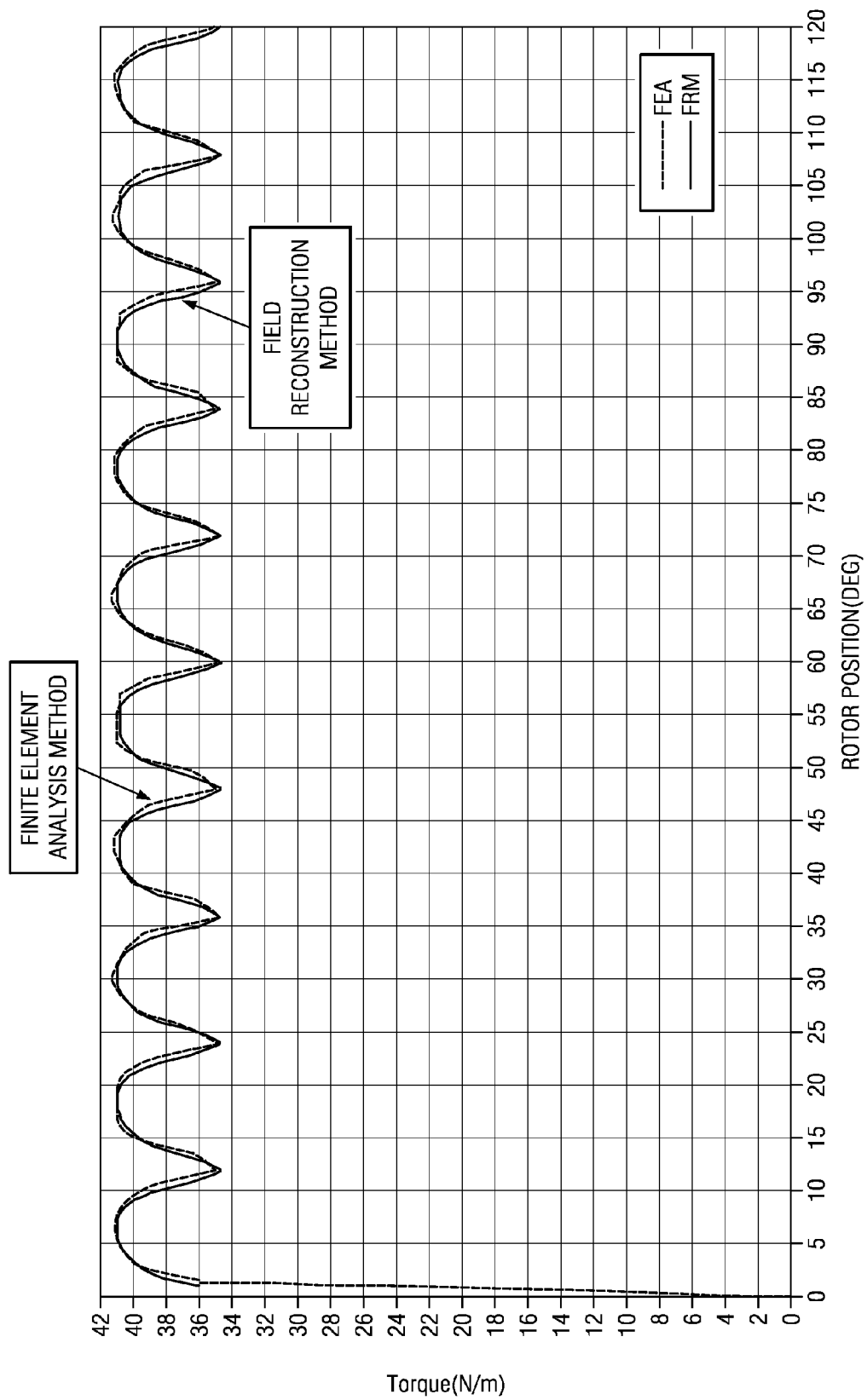
FIG. 5 is a graph comparing the torque obtained from FEA and FRM, in accordance with some embodiments.

There are a variety of ways to calculate the electromagnetic force in the electrical machines. The Maxwell Stress Tensor (MST) method is one such way. According to MST, the force component densities in the air gap can be calculated using the formulae expressed in equations (9) and (10), $$f_t = B_n B_t / \mu_0 \tag{9}$$

$$f_n = (B_n^2 - B_t^2)/2\mu_0 \tag{10}$$

in which $B_n$ and $B_t$ are the normal and the tangential components of the magnetic flux density, respectively. Therefore, the force components would be as expressed in equations (11) and (12), $$F_t = \oint_\Gamma \vec{f}_t \cdot d\vec{l} \tag{11}$$

$$F_n = \int_0^{2\pi} f_n r \, d\phi \tag{12}$$

where, Γ is the integration contour. Thus, for torque calculations, magnetic field components should be known. The MST method is quite effective in determining the magnetic field components provided that the FEA solutions are precise. The torque comparison for the FEA and the FRM is shown in FIG. 5. As can be seen, the torque from the FRM matches that from the FEA.

Figure 6A:
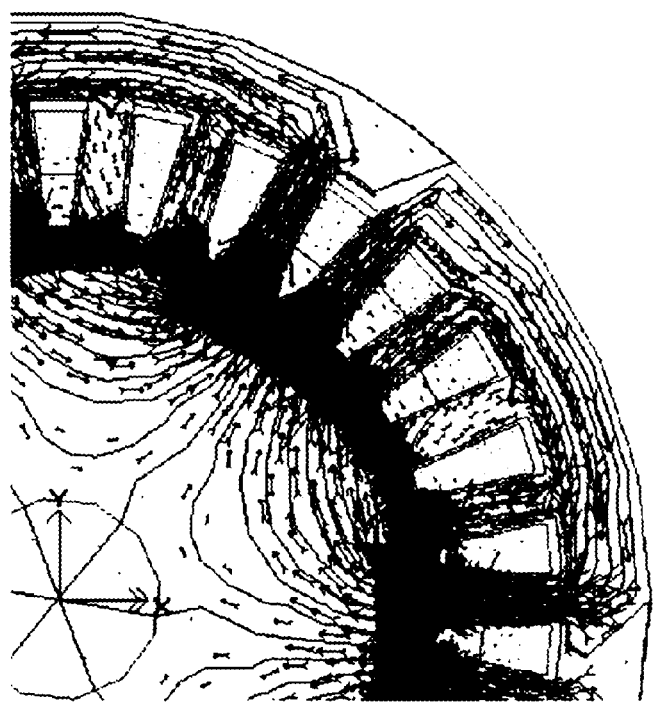
FIG. 6(a) is a schematic illustration showing the magnetic field distribution in the first quadrant of the PMSM, in accordance with some embodiments.

In order to calculate the flux linkage of each phase, the magnetic flux flowing through each stator tooth needs to be first computed. In the first step, using the field components in the middle of the airgap between the rotor and stator, the flux components in the stator teeth are calculated. The magnetic field distribution in the first quadrant of the model from FIG. 1 is shown in FIG. 6(a). According to this figure a dominant majority of the flux lines that exist in the airgap would enter the stator tooth from the top surface. So, the flux in each stator tooth can be calculated using the magnetic fields in the airgap. There would be a slight error in this calculation because of the leakage flux (i.e. some flux lines would enter the stator tooth from the side surfaces instead of the top surface). These flux lines are not accounted for in the calculation and therefore cause a slight error.

Figure 6B:
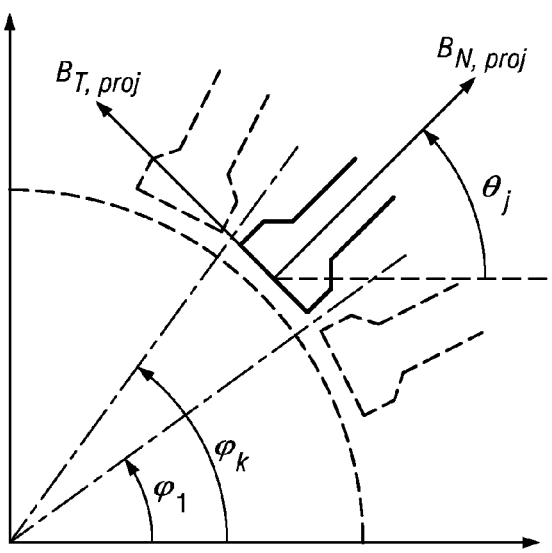
FIG. 6(b) is a schematic illustration showing the magnetic flux component projection into the middle of a stator tooth, in accordance with some embodiments.

The first step in the analysis is to create the FRM model of the machine. Using the field components in the middle of the airgap, the magnetic flux passing through each stator tooth may be calculated. For this purpose a portion of the contour passing through the middle of the airgap and covering a stator tooth is used. The span of magnetic field components corresponding to each stator tooth can be determined as expressed in equation (13a), $$S = \frac{360°}{L} \tag{13a}$$

where L denotes the number of stator teeth. In the PMSM of FIG. 1, there are 30 stator teeth so the magnetic components of each 12° span are designated to one tooth. Having partitioned the airgap, the next step is to project the magnetic field components to the axis passing through the middle of each stator tooth. This process is schematically shown in FIG. 6(b) and can be formulated using equation (13b), $$B_{proj}(j) = \sum_{i=1}^{K} \{B_{n,i}\cos(\phi_i - \theta_j) - B_{t,i}\sin(\phi_i - \theta_j)\} \quad (13b)$$

where, $\phi_i$ and $\theta_j$ are the positions of the field components in the airgap and the position of the projection axes in the model respectively. The indices i=1 . . . K and j=1 . . . L refer to the number of field components solutions in the airgap covering one stator tooth and the respective stator teeth order respectively. Having the normal field components, the flux in the airgap, which is almost equal to the flux in the stator tooth, can be calculated as expressed in equation (14), $$\Phi = \iint_S \vec{B}_{proj} \cdot d\vec{S} \quad (14)$$

The integration of equation (14) is performed on the surface which is concentric to the rotor surface and passes through the stator teeth.

Figure 7:
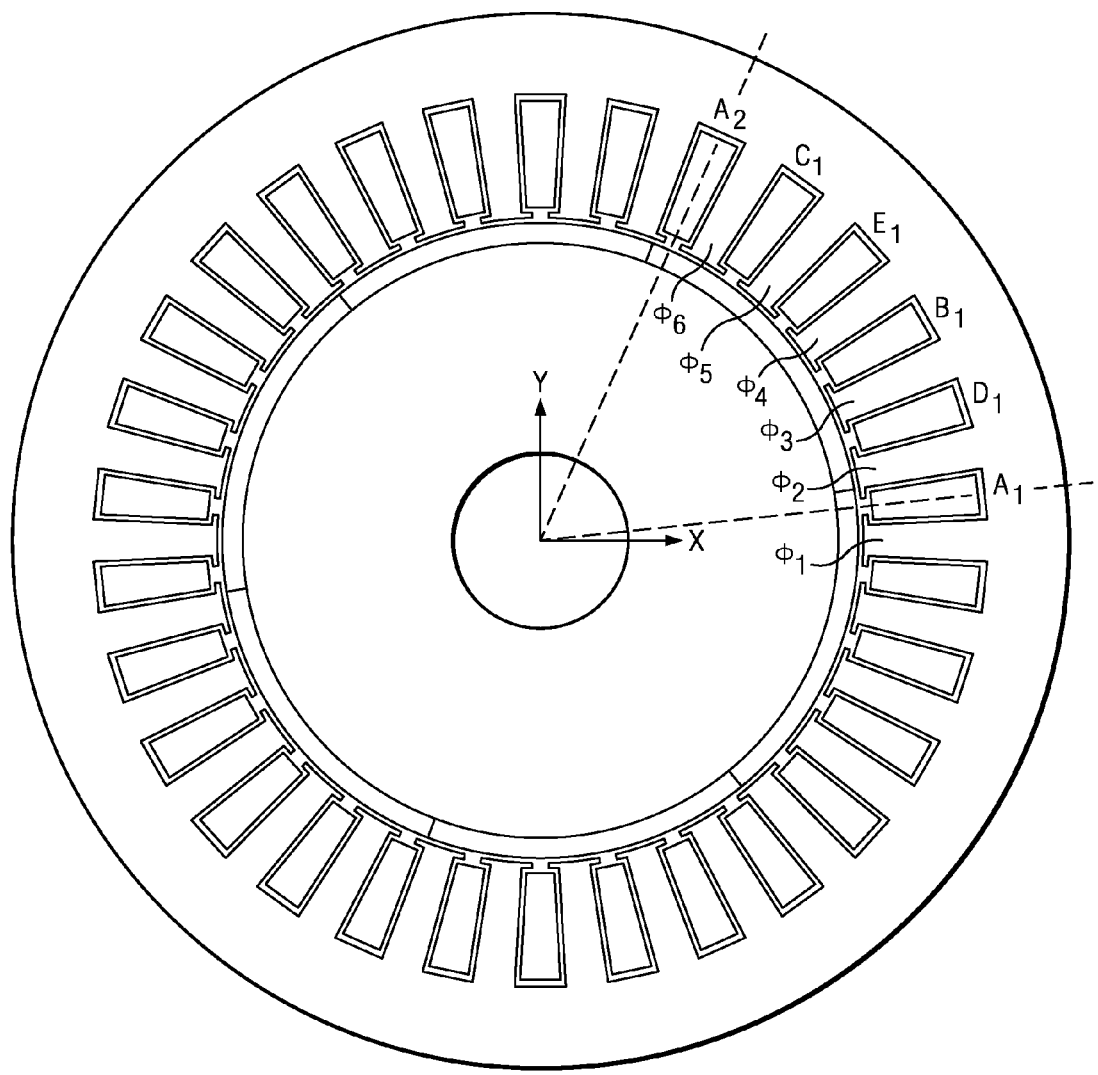
FIG. 7 is a schematic illustration showing flux assignment to stator teeth, in accordance with some embodiments.

In calculating the 5 phase flux linkages in the model of FIG. 1, the flux can be calculated for one pole and then tripled to get the phase flux linkage. FIG. 7 depicts the flux related to phase "A" in the first quadrant which is the A1-A2 set. The flux linkage of this winding is as expressed in equation (15).

$$\lambda_{Z1\text{-}A1} = N(\Phi_2+\Phi_3+\Phi_4+\Phi_5+\Phi_6) \quad (15)$$

So, the phase "A" flux linkage is as expressed in equation (16), $$\lambda_A = 3N(\Phi_2+\Phi_3+\Phi_4+\Phi_5+\Phi_6) \quad (16)$$

where, N represents the number of conductors in each coil. Equation (16) can be generalized into the following form as expressed in equation (17) for a machine with q stator tooth per pole per phase and 2P magnetic poles (P represents the number of magnetic pole pairs).

$$\lambda_A = PN * \sum_{k=1}^{q} \Phi_k \quad (17)$$

Figure 8:
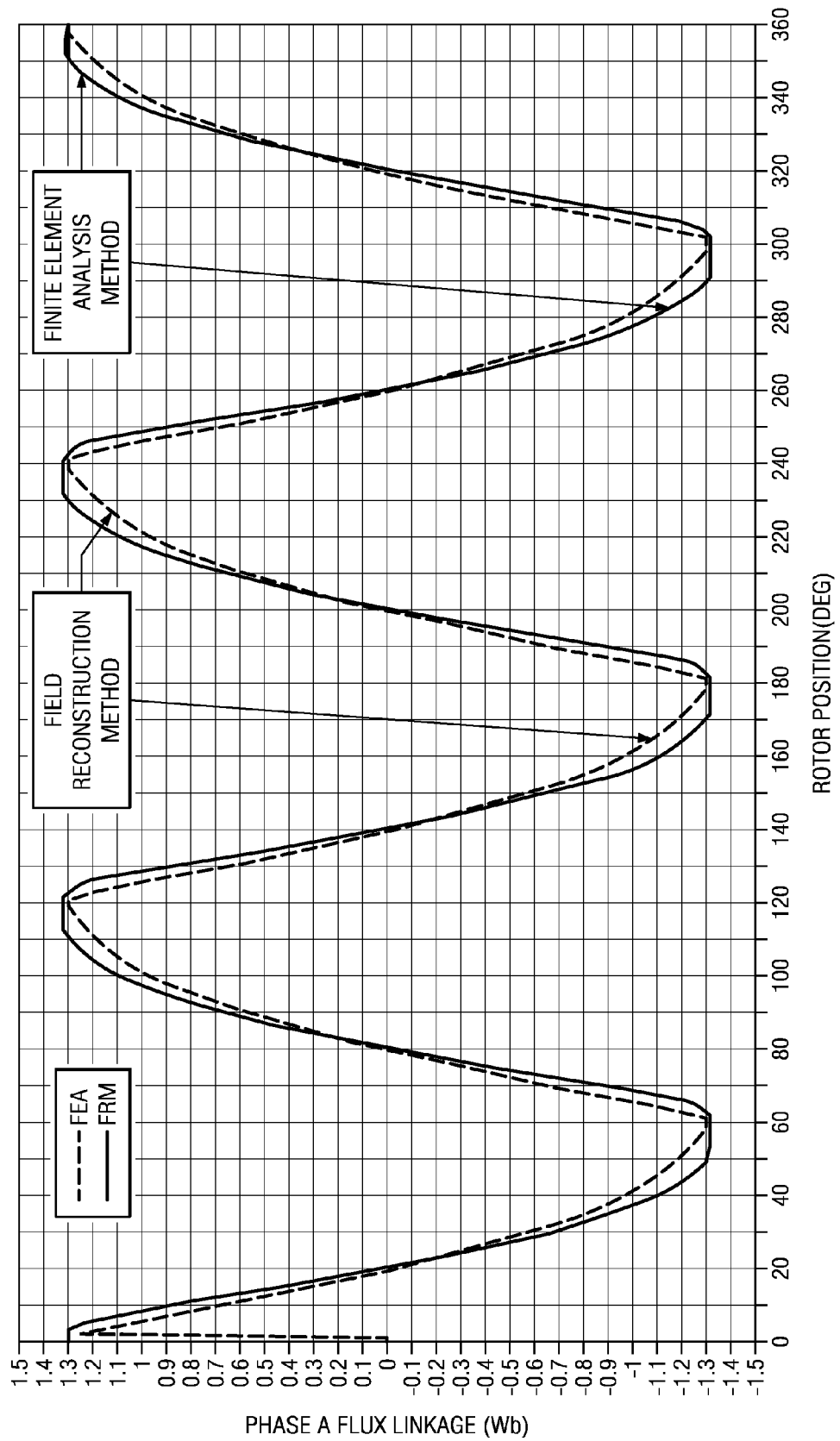
FIG. 8 is a graph of the phase "A" flux linkage calculated using the flux observer based on the FRM compared to that of the FEA, in accordance with some embodiments.

The same analysis can be carried out for phases "B", "C", "D", and "E". FIG. 8 depicts the phase "A" flux linkage calculated using the proposed method compared to that of the FEA. As can be seen, the flux observer based on the FRM is quite accurate compared to the FEA and also much faster.

Figure 9:
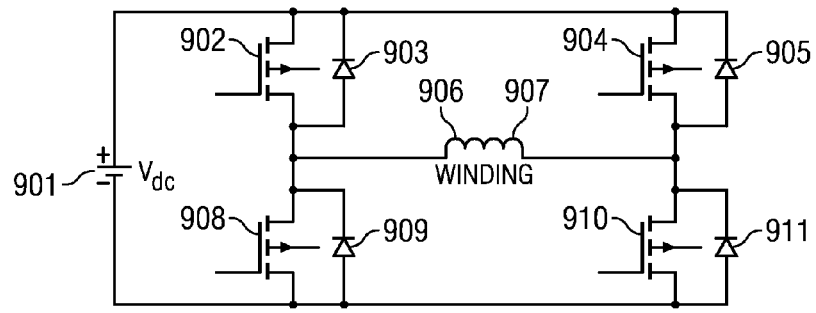
FIG. 9 is a schematic illustration showing a full bridge converter for one phase of the PMSM, in accordance with some embodiments.

The most frequently occurring faults in permanent magnet motor drives can be classified into faults related to electrical structure or faults related to mechanical structure. A multi phase drive, in which each phase is regarded as a single module is the most redundant design for fault tolerant purposes. These modules should have minimal impact on each other so that the failure in one does not affect the others. This modular approach requires separate single phase bridges and thus minimal electrical interaction. In the case of magnetic coupling between the phases, fault current in one can induce voltages in the remaining phases, which in turn causes problems especially in the control process and thus minimal magnetic interaction is also required. Additionally, the stator outer surface should be cooled down properly to minimize thermal interaction. To achieve these goals, the PMSM should be excited using separate full bridges per each phase. In this case if any of the stator phases or their corresponding power electronic converter experiences a fault, it can be disengaged from the healthy components. Based on this arrangement, possible faults on the power electronics components and electrical machine phases can be illustrated as shown in FIG. 9 of a full bridge converter for one phase of the PMSM. The faults can be classified into short and open-circuit faults in the DC link 901, short and open-circuit faults in switches 902, 904, 908, and 910, short and open-circuit faults in the diodes 903, 905, 909, and 911, open-circuit fault in the machine phase winding 906, and partial and complete short-circuit faults in the machine phase winding 907. Besides these faults, there are a set of faults that can happen in the sensors measuring current, voltage, and position. These types of fault will undermine the control accuracy and functionality. The second set of faults that can happen in an electromechanical energy converter are from a magnetic or mechanical nature and include partial demagnetization of the rotor magnets and static rotor shaft eccentricity.

Open-circuit faults: The open-circuit faults can either happen in the power electronics components or in the machine stator windings. Following an open-circuit in one of the stator phases, the current flowing into that phase will be zero. The open-circuit faults will deteriorate performance of the machine in terms of magnetic field generation and distribution which results in the loss of synchronism and a net drop in the torque. It must be noted that the open-circuit can be the result of an inter-turn short-circuit in stator winding which is detected and has forced the controller to disconnect the faulty stator phase. The FRM-based modeling of the machine would not be any different from that of the healthy machine. In case of an open-circuit, the current corresponding to that phase will be zero in the field reconstruction model. Accordingly, the magnetic field distribution and hence the flux linking each of the phases can be monitored for fault detection purposes.

Rotor partial demagnetization: In case of a PMSM drive, besides the regular monitoring of the current and voltage levels, maximum operating temperature is also limited due to the thermal limitations of the permanent magnets and stator windings. This thermal limit can be potentially exceeded due to poor ventilation (excessive heat) or excessive currents (extreme magnetic field) caused during short-circuits. These events would change the magnetic properties of the permanent magnets resulting in potential demagnetization. This demagnetization will affect the performance of the machine by a great extent. The main causes for demagnetization can be classified into thermal shock, mechanical shock, and magnetic shock. The permanent magnet can maintain its properties as long as its temperature is within the safe range. In the case of a short-circuit or overheating due to poor cooling, the temperature of the PMSM increases and can result in partial demagnetization. In this case, a degradation of the coercive force in the permanent magnet may occur. Variation of temperature can degrade the performance of the permanent magnets. Also, mechanical shock can partially or entirely damage the permanent magnets. Magnet degradation, especially for Nd—Fe—B permanent magnets, can occur in the case of inclined fields which normally lead to a phase displacement between the magnetization direction of the magnet and the applied field during machine operation. The demagnetization of the magnets has attracted considerable attention because demagnetization of the magnets in high power applications is one of the main issues. In most detection techniques, the harmonic contents of the stator current are used to detect the demagnetization. However, this method is not able to distinguish between the harmonics due to demagnetization and those caused by eccentricity.

Rotor eccentricity: The eccentricity of the rotor is one of the major faults in electrical machines due to the faulty bearings, unbalanced mass, and shaft bending. This type of eccentricity can be in the horizontal, the vertical, or both directions. The rotor eccentricity is equivalent to introducing unequal airgap between the stator and the rotor, thus causing an asymmetric distribution of the magnetic field in the airgap. The eccentricity of the rotor can be classified into either a static eccentricity or a dynamic eccentricity. In case of a static eccentricity, the position of minimal radial airgap length is constant during the rotation of the rotor meaning that the rotor is shifted towards one side but it does not move during rotation. In the case of static eccentricity, the amplitude of the forces applied to the stator teeth would alter and result in unbalanced radial forces. This can cause magnetic and dynamic issues resulting in vibrations, noise, and torque pulsations. There are various methods of eccentricity fault detection, such as current spectrum analysis. In the case of a dynamic eccentricity, the center of the shaft rotates and the airgap changes dynamically during rotation.

Figure 10:
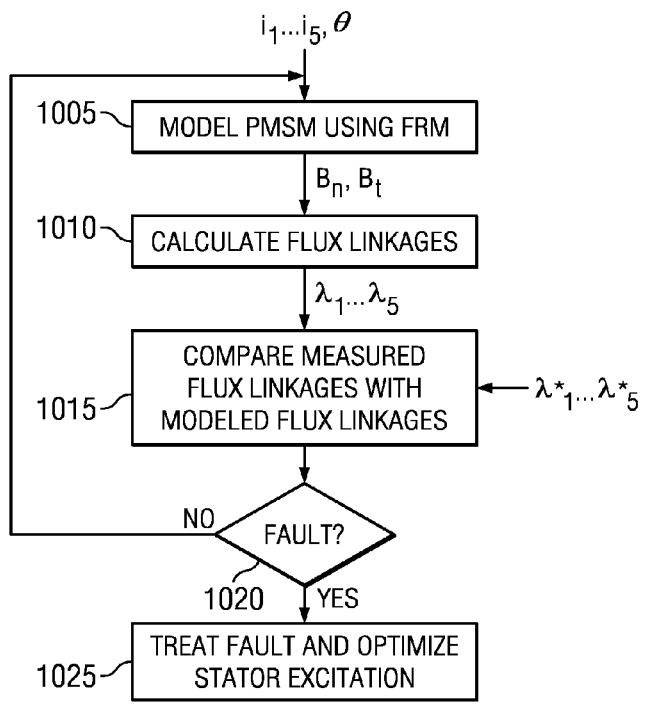
FIG. 10 is a flow diagram illustrating the fault detection scheme, in accordance with some embodiments.

In order to detect the faults in the stator phases, a combination of the flux based and current based techniques are considered. The technique includes the injection of the measured currents into the field reconstruction module and determination of the flux linkages due to the current and then comparison of the resulting fluxes with those of the healthy, no-fault machine. In case of a fault, the flux linkages can be investigated to determine the type of the fault. The fault detection scheme is illustrated in the block diagram of FIG. 10. Processing begins at block 1005 where the PMSM is modeled using the field reconstruction method with the phase currents $i_1 \ldots i_5$ and the rotor position $\theta$ to determine the normal and tangential components of the magnetic flux density, $B_n$ and $B_t$, respectively. Next, the flux linkages, $\lambda_1 \ldots \lambda_5$, are calculated at block 1010. At block 1015, a comparison is done between the flux linkage calculation from the model, $\lambda_1 \ldots \lambda_5$, and the measurement, $\lambda^*_1 \ldots \lambda^*_5$. At block 1020, a decision is made whether a fault exists. If no fault exists, the process repeats itself by looping back to block 1005. If there is a fault, the process proceeds to fault treatment and optimal stator excitation in block 1025.

Figure 11:
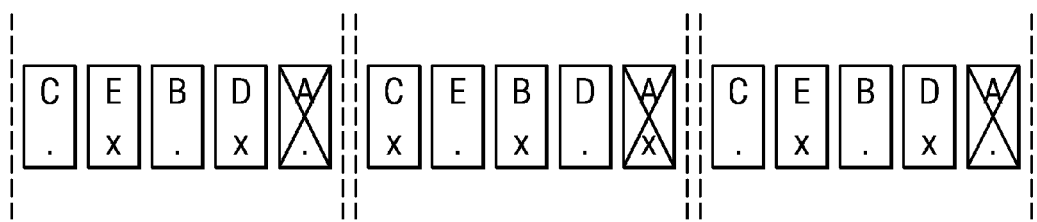
FIG. 11 is a schematic illustrating the arrangement of the phase windings in the machine for a single phase open-circuit fault which takes place in phase "A", in accordance with some embodiments.
Figure 12:
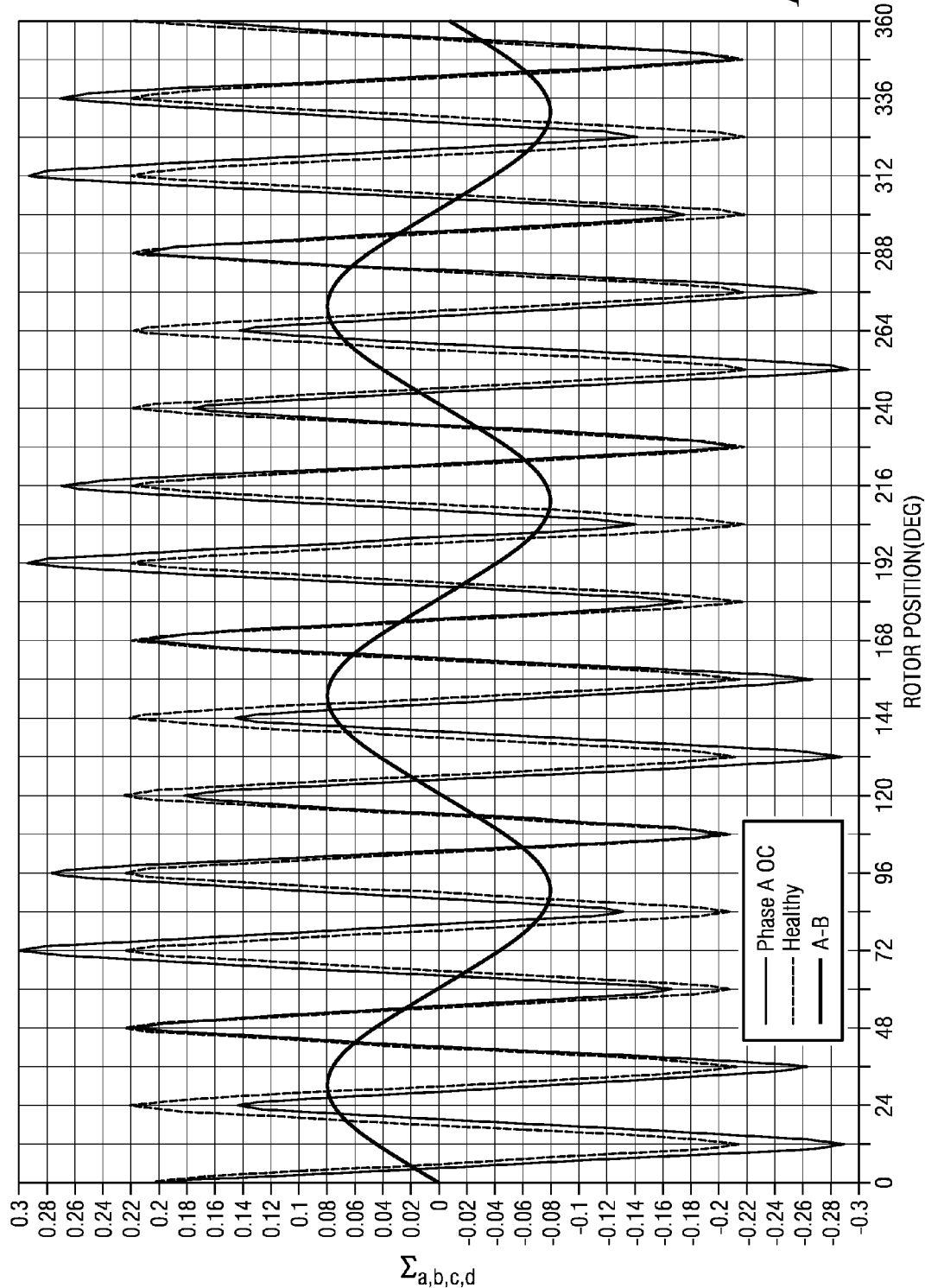
FIG. 12 is a graph illustrating the fault signature for the case of the healthy operation and phase "A" open-circuit fault, in accordance with some embodiments.

Open-circuit fault detection: The electrical power is supplied to the machine through the stator phases. Loss of any of the phases would result in lower input power to the machine and hence the output torque would be lower than expected. This lower output can potentially endanger the machine operation. Therefore, the fault should be detected immediately and remedial actions should be carried out. The open-circuit fault is not a catastrophic fault as compared to the short-circuit faults which should be cleared immediately, but the stator excitation should be modified to compensate for the lack of energy if possible. In order to detect the faults in the stator phases, the applied current is fed into the FRM module. As mentioned before the normal and tangential components of the magnetic field may be calculated using the FRM. Then these field components are used to calculate the flux in each of the stator teeth. The calculated fluxes are then compared to the expected values. Based on the number of lost phases and their location, different scenarios can be considered. FIG. 11 illustrates the arrangement of the phase windings in the machine for a single phase open-circuit fault which takes place in phase "A". In order to detect the fault, the sum of the 5 phase flux linkages are considered as the fault signature. For a balanced system, this sum is equal to zero. The fault signature for the case of the healthy operation and phase "A" open-circuit fault is shown in FIG. 12. In case of a single phase open-circuit fault on any stator phase, the difference between the healthy case and the faulty case signature is a sinusoidal whose amplitude and phase shift is different depending on the place of fault. Table I summarizes the fault detection signatures in case of a single phase open-circuit fault.

TABLE I

Single Phase Open-Circuit Signature

| FAULTY PHASE | SIGNATURE $\left( \sum_{i=a,b,c,d,e}^{healthy} \lambda_i - \sum_{i=a,b,c,d,e}^{faulty} \lambda_i \right)$ |
|---|---|
| A | $K_1 \sin(\phi)$ |
| B | $K_1 \sin(\phi - 72)$ |
| C | $K_1 \sin(\phi - 144)$ |
| D | $K_1 \sin(\phi + 144)$ |
| E | $K_1 \sin(\phi + 72)$ |

Figure 13:
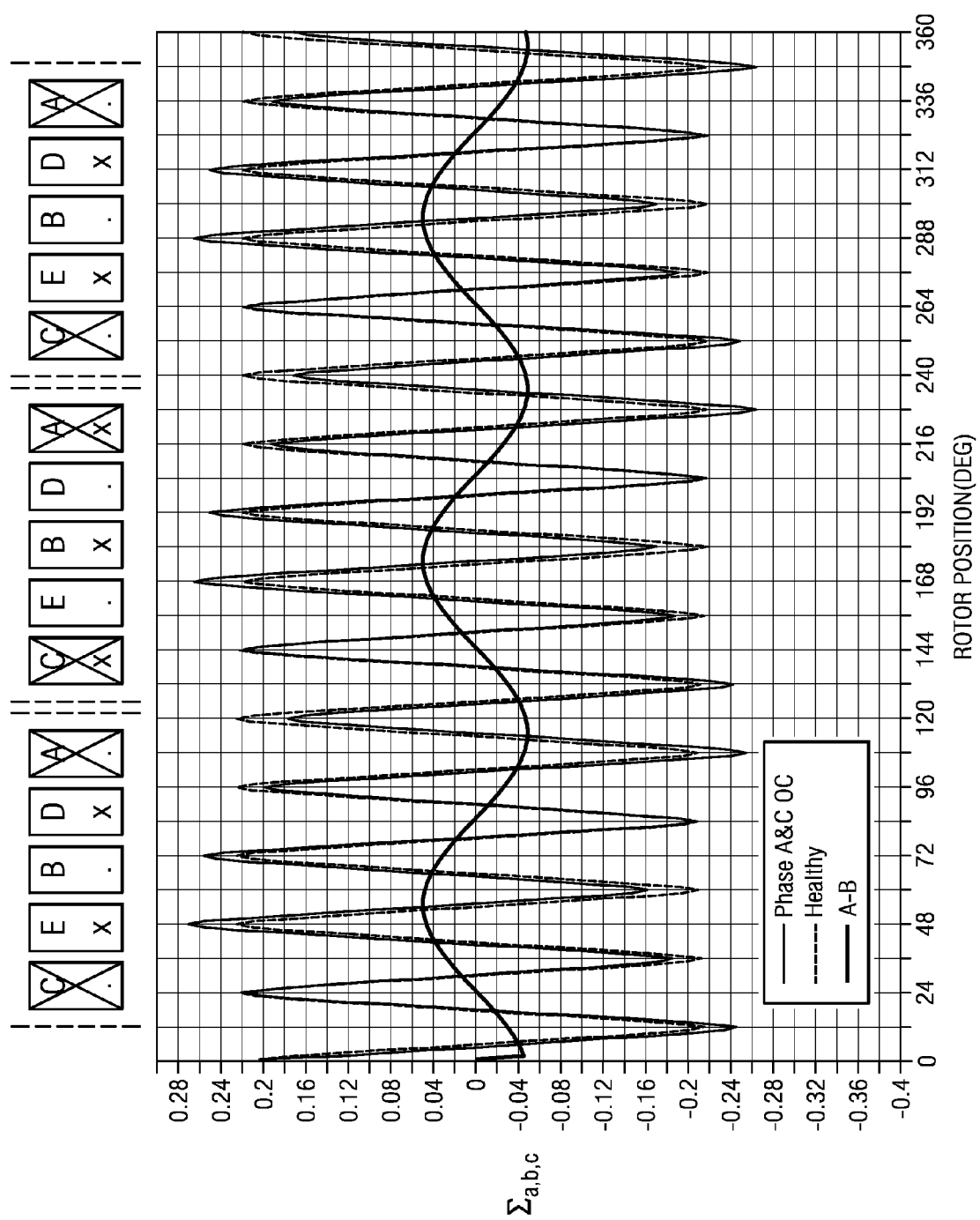
FIG. 13 depicts the winding arrangement and the fault signature for the case of an adjacent open-circuit fault on phases "A" and "C", in accordance with some embodiments.

The same method can be used to detect double and even triple open-circuit faults in the machine. In the case of double and triple open phases, besides the number of open phases and their location, there is another factor that affects the fault signature and the post fault treatment scheme. It is important whether adjacent or nonadjacent phases are missing. FIG. 13 depicts the winding arrangement and the fault signature for the case of an adjacent open-circuit fault on phases "A" and "C". It should be noted that open-circuit conditions may arise from malfunction of the switches, clearing an inter-turn short-circuit, or an actual open-circuit in the coils. The use of flux linkage signatures provides a systematic approach to all potential faults in the machine.

Figure 14:
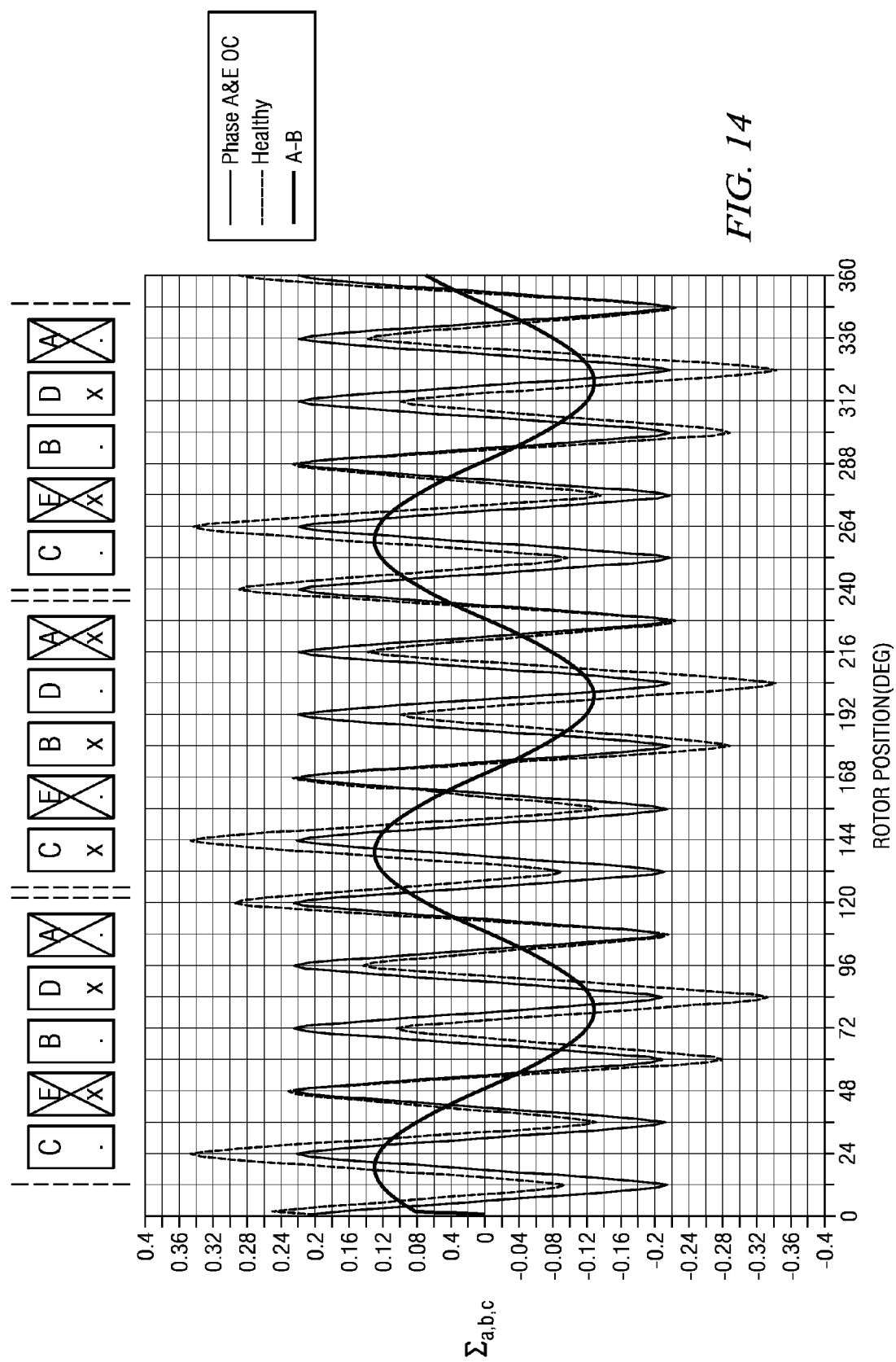
FIG. 14 depicts the winding arrangement and fault signature for the case of a non-adjacent double open-circuit, in accordance with some embodiments.

In case of a non-adjacent double open-circuit, the signature will be different from that of the adjacent case. FIG. 14 depicts the winding arrangement and fault signature for this case. Table II summarizes the fault detection signatures in case of an adjacent or non-adjacent double phase open-circuit fault.

TABLE II

Double Phase Open-Circuit Signature

| FAULTY PHASE | | SIGNATURE $\left( \sum_{i=a,b,c,d,e}^{healthy} \lambda_i - \sum_{i=a,b,c,d,e}^{faulty} \lambda_i \right)$ |
|---|---|---|
| ADJACENT PHASES | AD | $K_2 \sin(\phi + 72)$ |
| | AC | $K_2 \sin(\phi - 72)$ |
| | BD | $K_2 \sin(\phi + 144)$ |
| | BE | $K_2 \sin(\phi)$ |
| | CE | $K_2 \sin(\phi - 144)$ |
| NON ADJACENT PHASES | AB | $K_3 \sin(\phi - 36)$ |
| | AE | $K_3 \sin(\phi + 36)$ |
| | BC | $K_3 \sin(\phi - 108)$ |
| | CD | $K_3 \sin(\phi - 180)$ |
| | DE | $K_3 \sin(\phi + 108)$ |

According to Table II, the double open-circuit faults can be determined uniquely for each case using the proposed signature. Comparing Table II with that of the single phase fault case, Table I, it can be seen that the single and double phase open-circuits can be uniquely determined using the specified signature.

Figure 15:
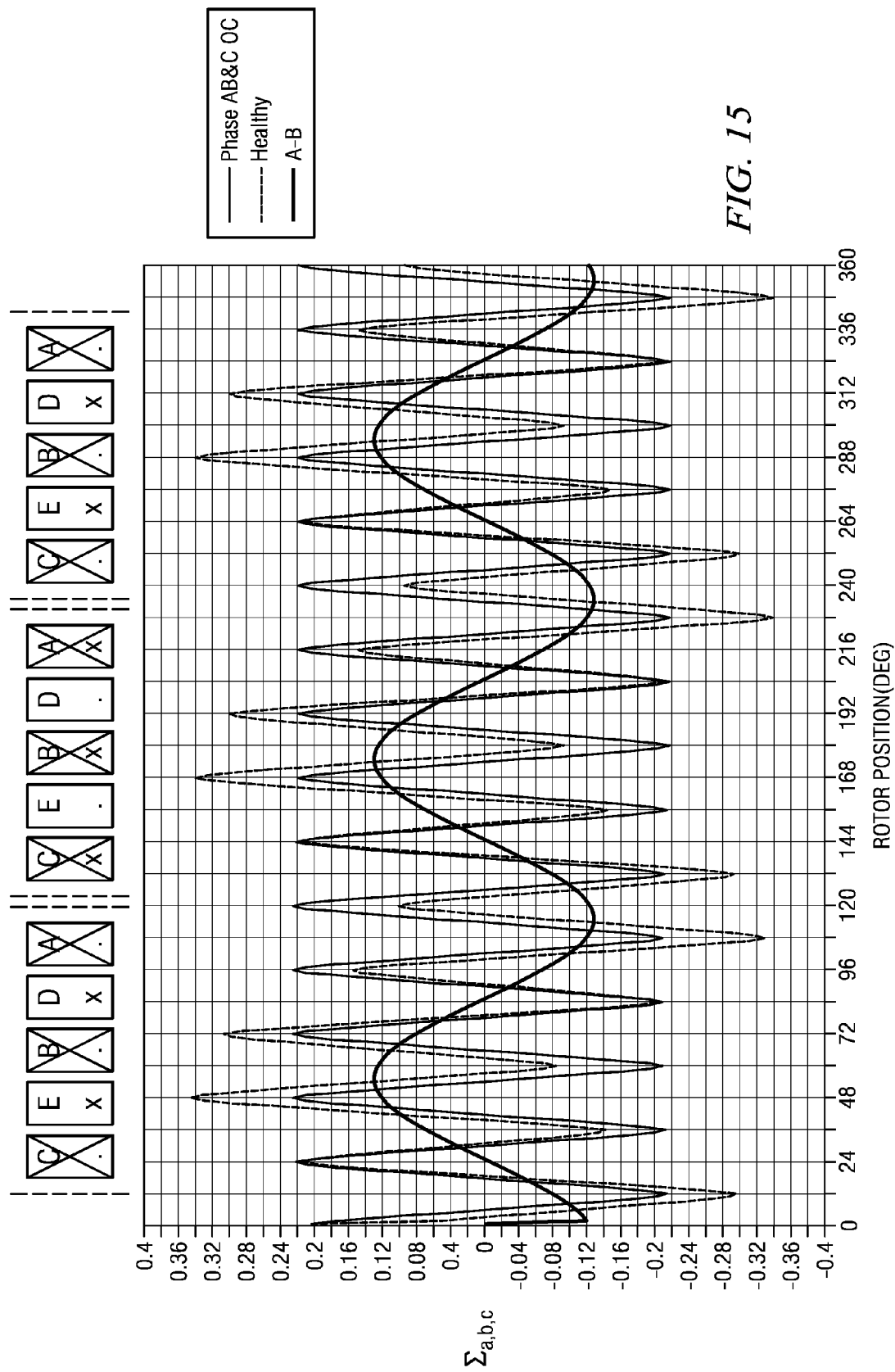
FIG. 15 depicts the winding arrangement and the fault signature for the case of a non-adjacent open-circuit fault on phases "A", "B", and "C", in accordance with some embodiments.
Figure 16:
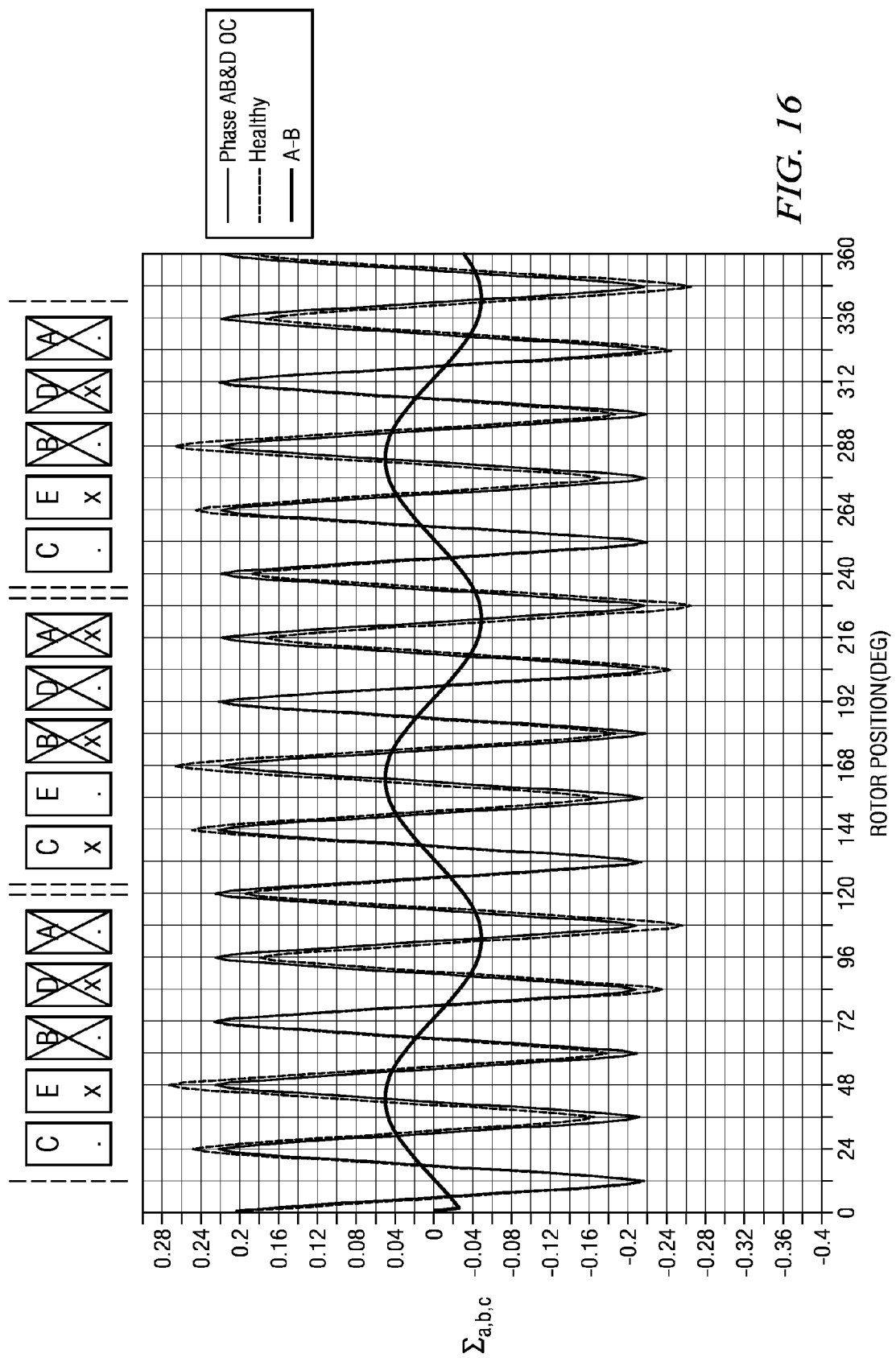
FIG. 16 depicts the winding arrangement and the fault signature for the case of a triple open-circuit fault on phases "A", "B", and "D", in accordance with some embodiments.

Triple phase open-circuits may also occur on adjacent and non adjacent phases. FIG. 15 depicts the winding arrangement and the fault signature for the case of a non-adjacent open-circuit fault on phases "A", "B", and "C". FIG. 16 depicts the winding arrangement and the fault signature for the case of a triple open-circuit fault on phases "A", "B", and "D". By analyzing the fault signature figures, the signature to detect each fault can be determined as summarized in Table III.

TABLE III

Triple Phase Open-Circuit Signature

| FAULTY PHASE | | SIGNATURE $\left( \sum_{i=a,b,c,d,e}^{healthy} \lambda_i - \sum_{i=a,b,c,d,e}^{faulty} \lambda_i \right)$ |
|---|---|---|
| ADJACENT PHASES | ABD | $K_2 \sin(\phi - 36)$ |
| | ACE | $K_2 \sin(\phi + 36)$ |
| | BDE | $K_2 \sin(\phi + 108)$ |
| | BCE | $K_2 \sin(\phi - 108)$ |
| | ADC | $K_2 \sin(\phi - 180)$ |
| NON ADJACENT PHASES | ABC | $K_3 \sin(\phi - 72)$ |
| | ABE | $K_3 \sin(\phi)$ |
| | BCD | $K_3 \sin(\phi - 144)$ |
| | CDE | $K_3 \sin(\phi + 144)$ |
| | ADE | $K_3 \sin(\phi + 72)$ |

In all cases, the flux linkages of the stator phases are calculated using the FRM technique. Consequently, the proposed signature is calculated and compared with each of the potential permutations that are presented in Tables I, II, and III. Based on matching the case, the type and place of the fault can be determined.

Figure 17:
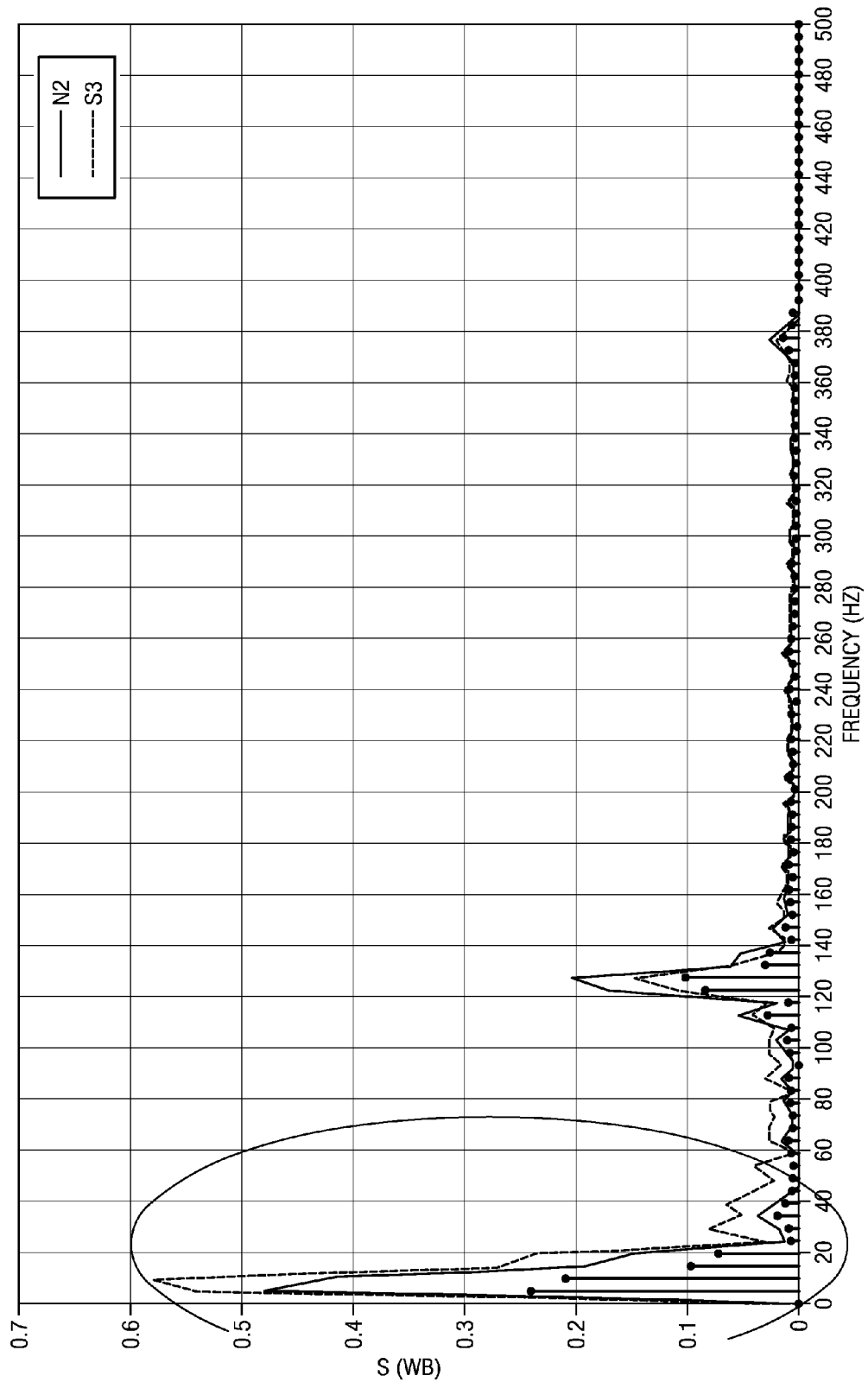
FIG. 17 is a graph of the frequency spectrum of the fault signature for single magnet demagnetization, in accordance with some embodiments.
Figure 18:
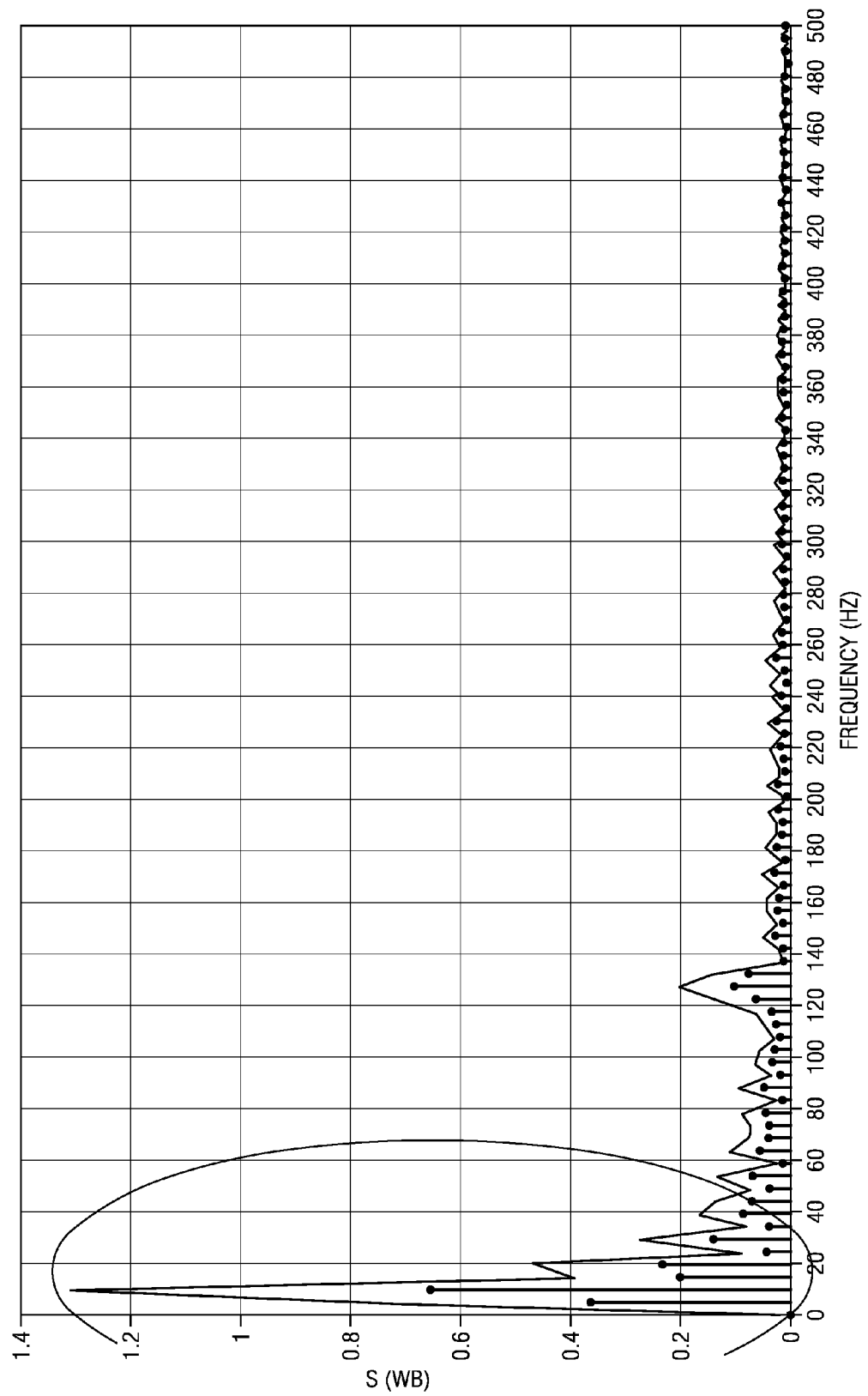
FIG. 18 is a graph of the frequency spectrum of the fault signature for double magnet demagnetization, in accordance with some embodiments.

Partial demagnetization detection: The most important task in fault detection is to find unique signatures that can be detected with minimal chance of a false alarm. For this purpose, generally the quantities such as current, voltage, etc. are monitored. In case of a healthy machine, while the phase voltages are balanced, the sum of the voltages and therefore the flux linkages are zero. Table IV illustrates possible demagnetization faults in the PMSM of FIG. 1. The frequency spectrums of the fault signature S for single magnet and double magnet demagnetization are shown in FIG. 17 and FIG. 18, respectively. The same analysis is performed on the other possible cases of demagnetization. It is shown that in case of partial demagnetization, a set of frequencies would be present in the FFT spectrum of S as summarized in Table IV.

TABLE IV

Demagnetization Scenarios

| FAULT SCENARIO | PLACE | FREQUENCIES TO DETECT |
|---|---|---|
| SINGLE MAGNET DEMAGNETIZATION | N2 | $f_1 = 4.89$ |
| | S3 | $f_2 = 9.78$ |
| DOUBLE MAGNET DEMAGNETIZATION | N1N2 | $f_3 = 14.67$ |
| | S1S2 | $f_4 = 19.56$ |
| TRIPLE MAGNET DEMAGNETIZATION | N1N2N3 | $f_5 = 24.46$, |
| | S1S2S3 | $f_6 = 29.35$ |
| 2 PAIR DEMAGNETIZATION | N1N2S1S2 | $f_7 = 34.24$ |
| | | $f_8 = 39.13, \ldots$ |

These frequencies could be used for detection purposes. According to the figures and data from Table IV and considering that the frequency of the stator sinusoidal current is known, the following relationship between the detected frequency components and type of fault can be established as expressed in equation (18), $$f_{dem} = \frac{k}{2P} \cdot f_e \quad k = 1, 2, 3, \ldots \tag{18}$$

where P and $f_e$ are the number of magnetic pole pairs and stator current frequency, respectively. The magnetic flux density components are calculated using the field reconstruction method for one electrical cycle. Then these components would be used to determine the flux passing each stator tooth which is used to calculate the flux linkages of the stator phases. Next, the expected flux linkages are compared with the actual quantities. By applying the FFT and low pass filtering, the signature frequencies can be extracted.

Figure 19:
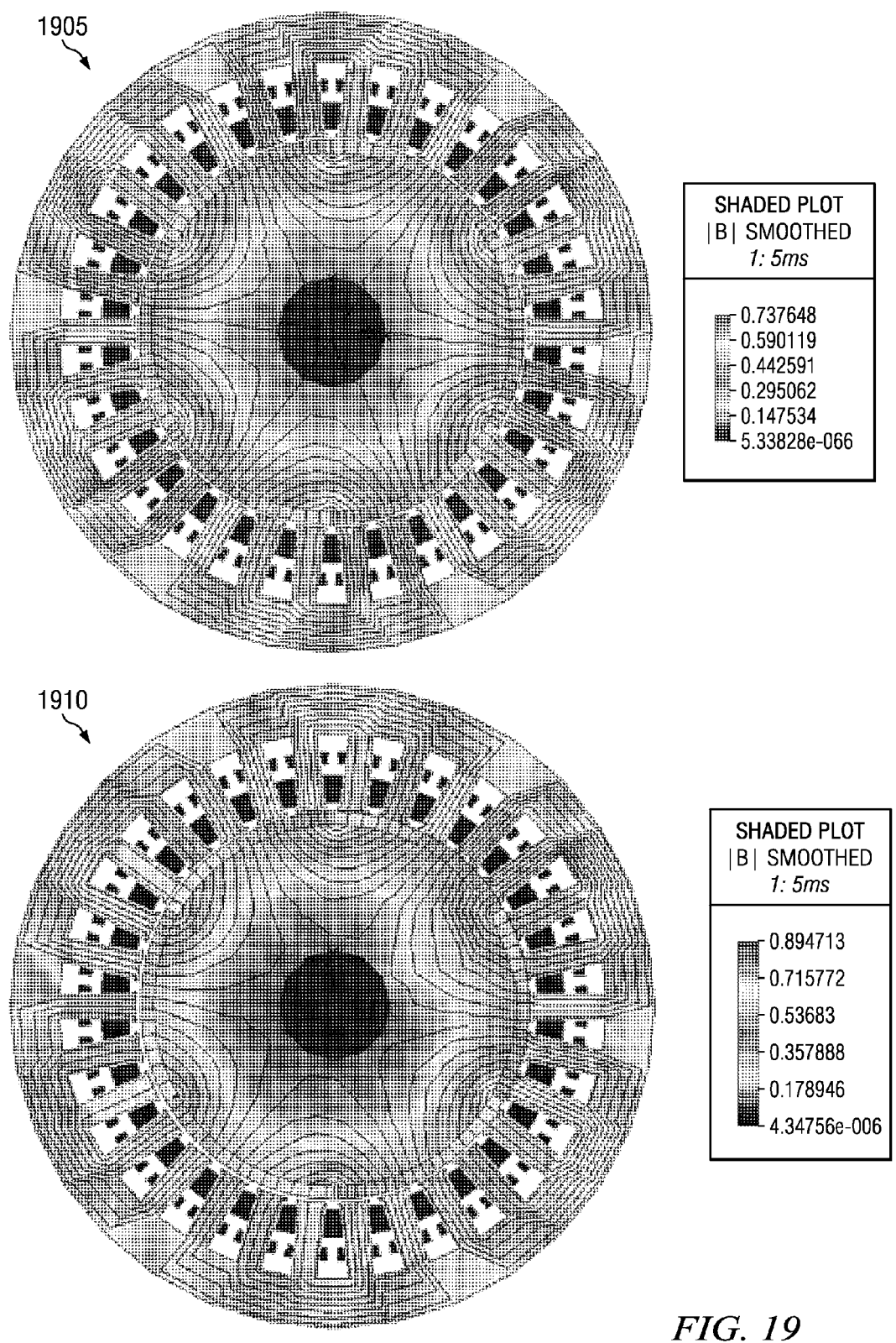
FIG. 19 illustrates the comparison of the magnetic flux distribution within a healthy machine and the magnetic flux distribution within a PMSM with an eccentric rotor, in accordance with some embodiments.
Figure 20:
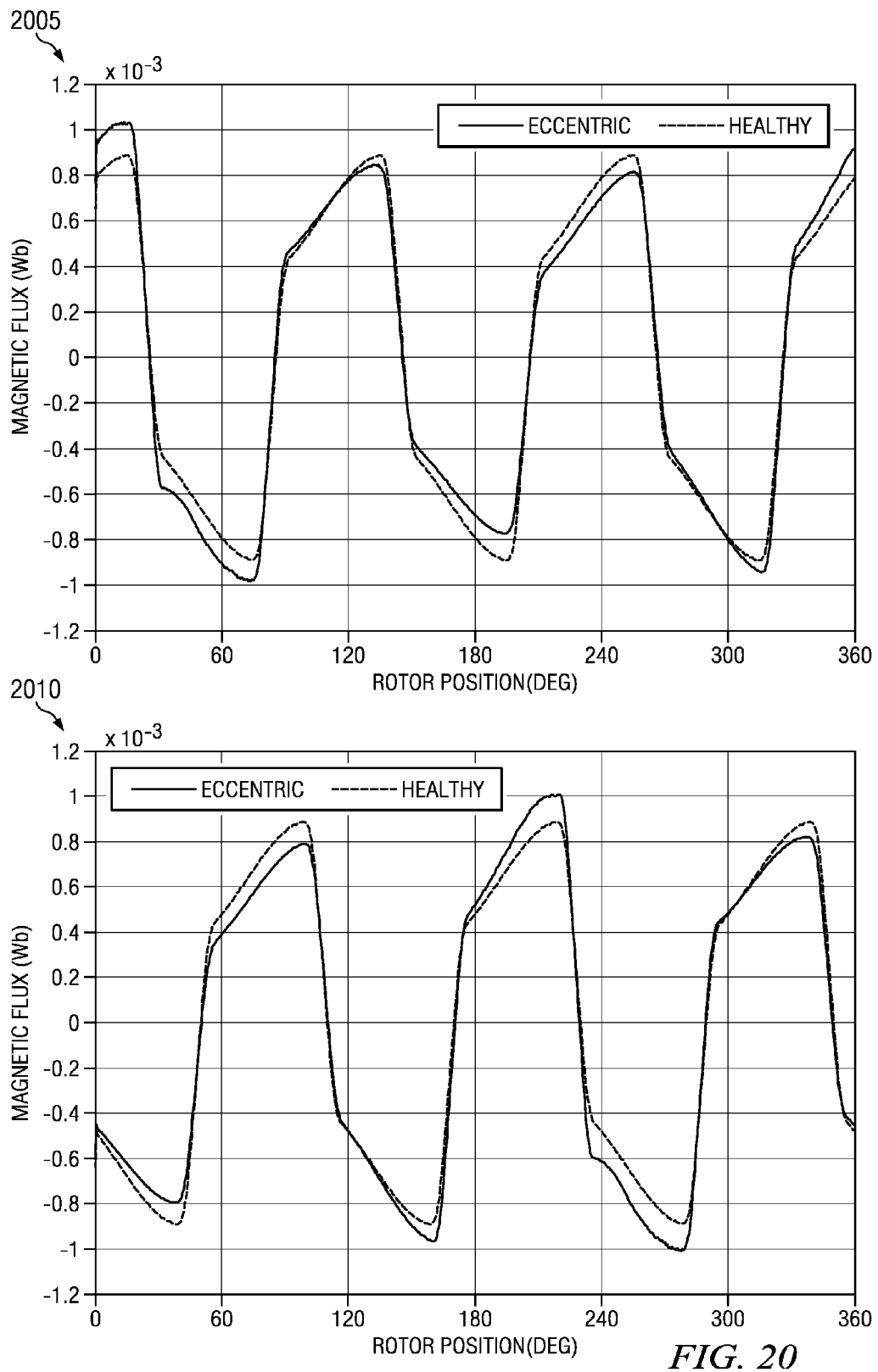
FIG. 20 depicts the flux passing the third stator tooth and the twentieth stator tooth in the case of an eccentric rotor compared with that of the healthy machine, in accordance with some embodiments.

Rotor eccentricity detection: In the case of static eccentricity, as the rotor is closer to a set of stator windings, the magnetic and therefore electric balance will be lost. As a result, for the same amount of applied current, as in the case of a healthy PMSM, some of the stator teeth will have higher levels of magnetic flux due to the proximity to the permanent magnets. FIG. 19 illustrates the comparison of the magnetic flux distribution within a healthy machine 1905 and the magnetic flux distribution within a PMSM with an eccentric rotor 1910. It can be seen that the peak of magnetic flux is higher in case of an eccentric rotor. Also, in case of an eccentric rotor, the distribution of the magnetic flux around the airgap is no longer uniform. This signature can be used to determine the eccentricity of the rotor. The unbalance in the magnetic flux linking each stator phase can be used to detect the eccentricity. The flux passing each stator tooth is measured using the FRM module and compared with the flux for the healthy case and the unbalance of the flux shows the eccentricity of the rotor. It should be mentioned that in the case of an eccentric rotor, there is no deformity in the magnetic flux waveform as observed in the case of PM demagnetization and the difference is observable in the magnitude of the flux. FIG. 20 depicts the flux passing the third stator tooth 2005 and the twentieth stator tooth 2010 in the case of an eccentric rotor compared with that of the healthy machine. An eccentricity of 30% has been considered for the rotor in FIG. 20.

Fault treatment is an important step in optimizing machine performance after a fault is detected and cleared. Most of the research conducted on the fault analysis is concentrated on the methods of the fault detection. Most researchers do not address what happens to the system operation after the fault is detected and cleared. Some of the fault tolerant methods suggest increasing the redundancy of the system to compensate for the component loss in case of the fault. The redundancy of the system is not always possible because of the limitation in the available space or due to the high price of the equivalent replacement device. On the other hand increasing the redundancy leads to a more complicated control strategy which includes a higher cost of control modules.

The optimal currents for all the fault scenarios are obtained and stored. In case the fault occurs, based on the type and location of the fault, the appropriate set of currents would be applied to the PMSM stator phases to maximize the possible torque per ampere. The optimization criteria can be changed based on the application. Here the maximum average torque is considered while the torque ripple is minimized.

Figure 21A:
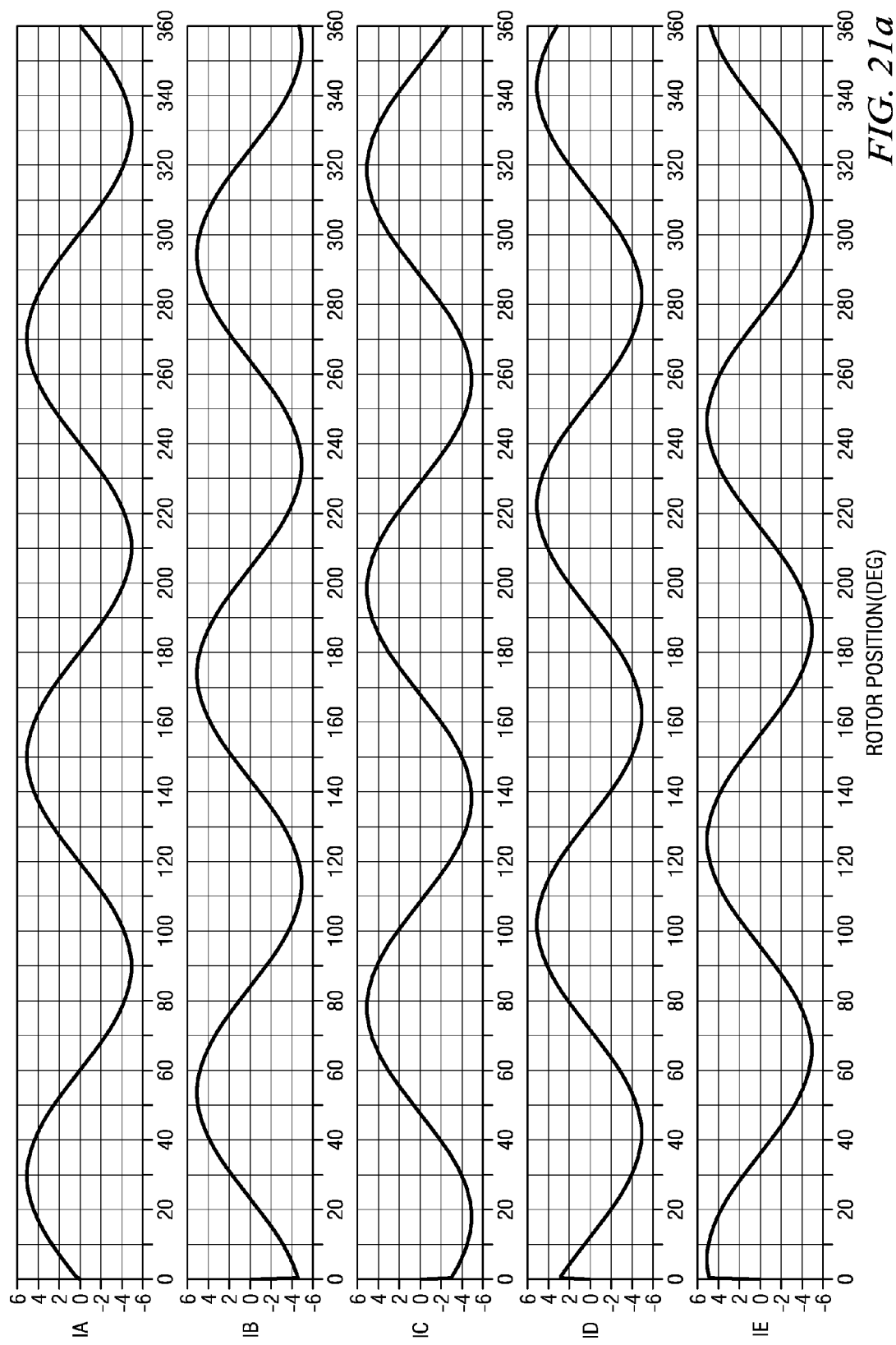
FIGS. 21(a) and (b) represent the stator current and torque for the case of sinusoidal excitation, respectively, of the 5-phase PMSM machine from FIG. 1, in accordance with some embodiments.
Figure 21B:
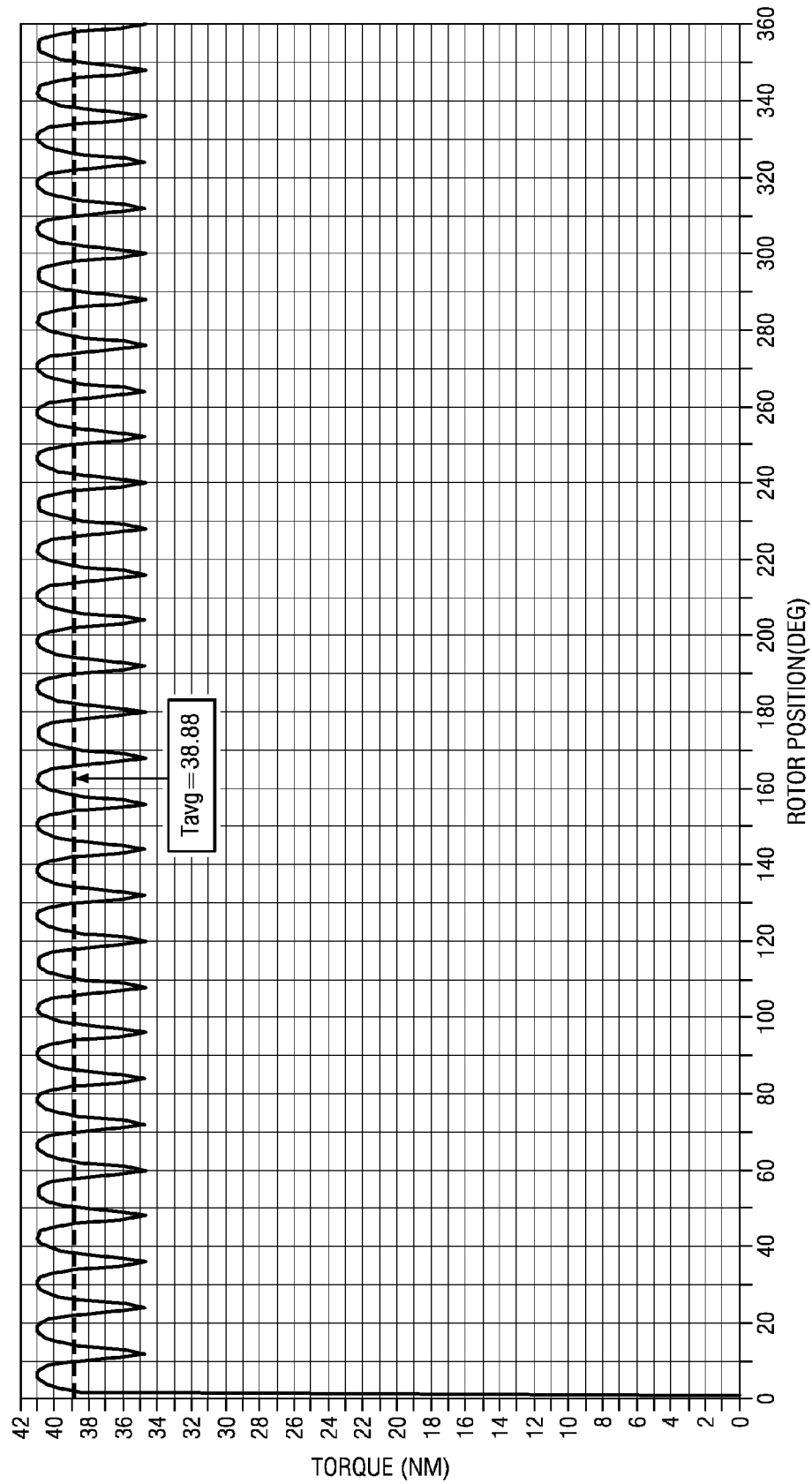
Figure 22A:
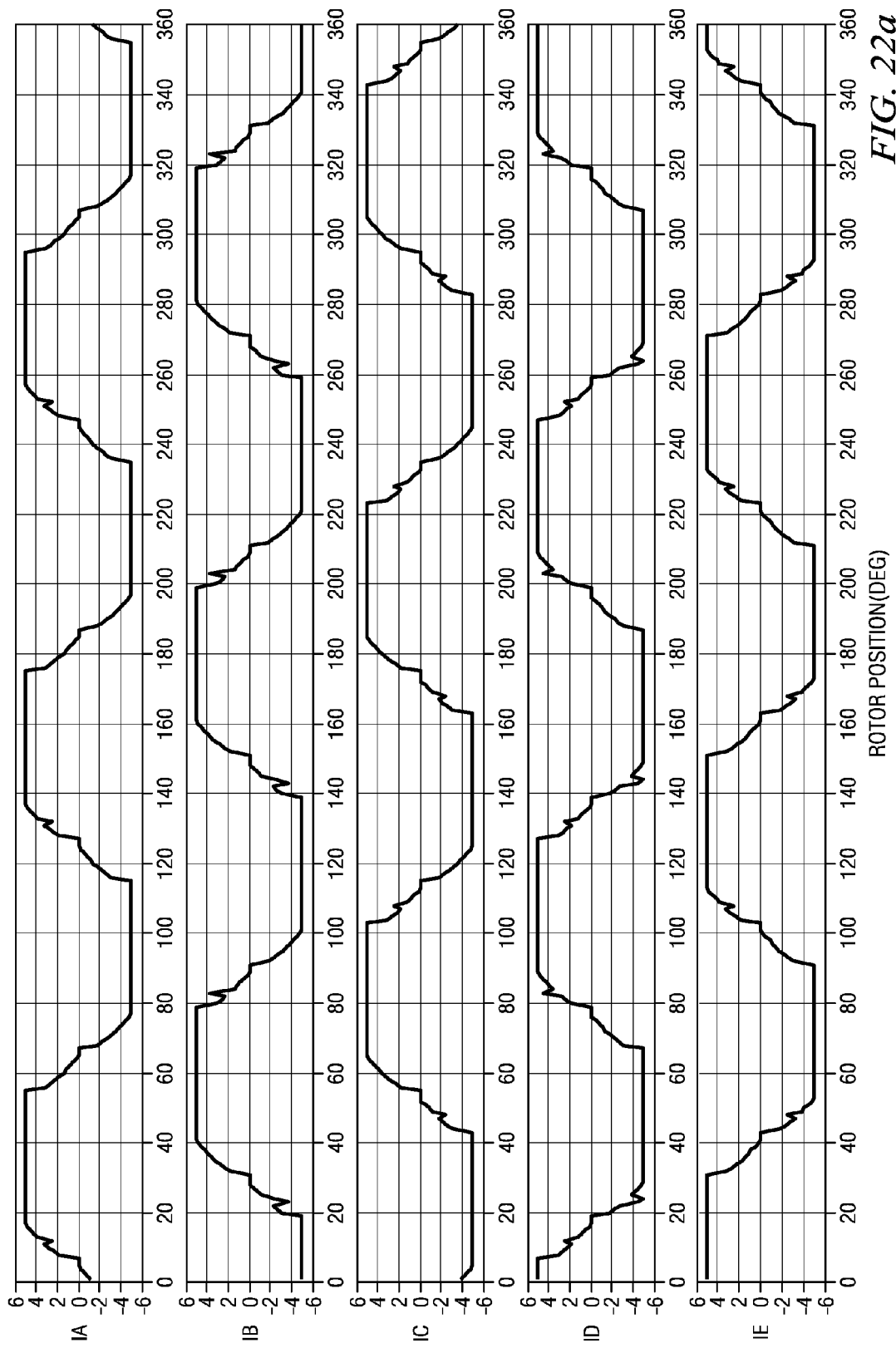
FIGS. 22(a) and (b) represent the stator current and torque for the case of optimal excitation, respectively, of the 5-phase PMSM machine from FIG. 1, in accordance with some embodiments.
Figure 22B:
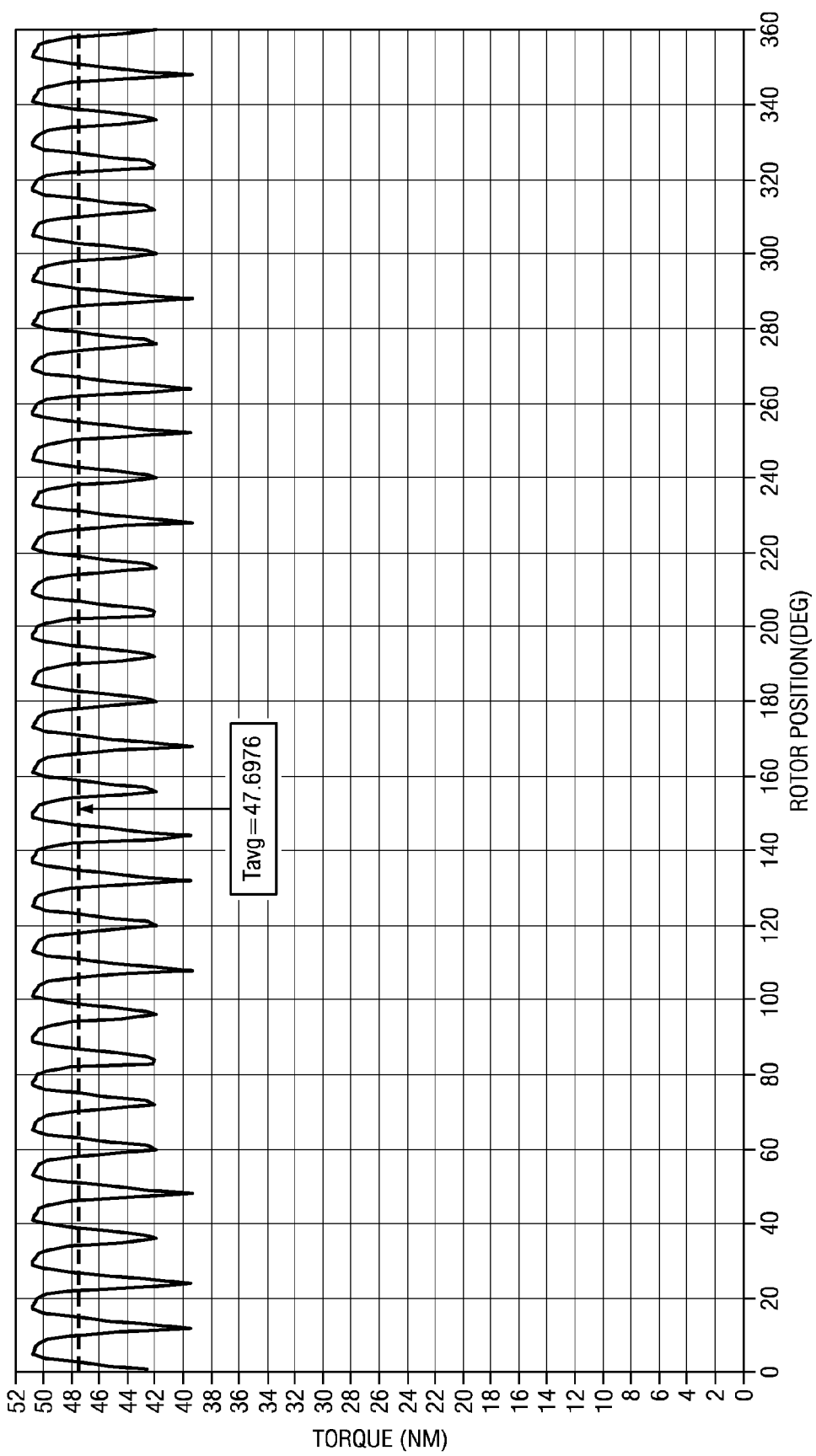

Open-circuit fault treatment: In most applications it is desirable to have the maximum output torque possible while the torque ripple is minimized. This is not necessarily the most efficient way of running the motor drive, especially in terms of losses and harmonics. Normally, the sinusoidal excitation is used to drive the system because it introduces fewer harmonics into the machine, hence reducing the losses and eliminating the need of filters. However, in applications where the maximum torque per RMS input current is targeted, sinusoidal excitation might not be the best choice. FIGS. 21(a) and (b) represent the stator current and torque for the case of sinusoidal excitation, respectively, of the 5-phase PMSM machine from FIG. 1. The average torque, Tavg, for this case is 38.88. FIGS. 22(a) and (b) represent the stator current and torque for the case of optimal excitation, respectively, of the 5-phase PMSM machine from FIG. 1. The average torque, Tavg, for this case is 47.6976. The FRM and the FEA models of the machine from FIG. 1 are used in the optimization process. To obtain the optimized waveforms, the FRM technique is used in conjunction with the MATLAB® optimization toolbox. It can be seen that in the case of the optimal excitation, the average output torque as well as the torque per ampere ratio are higher than in the case of the sinusoidal excitation. Table V depicts the numerical comparison of these two cases.

TABLE V

Torque comparison for sinusoidal and optimal currents

| TYPE OF EXCITATION | $T/I_{rms}$ |
|---|---|
| SINUSOIDAL | $T/I_{rms}$ = 38.88/3.5355 = 10.997 |
| OPTIMAL | $T/I_{rms}$ = 47.6976/4.2979 = 11.098 |

Figure 23A:
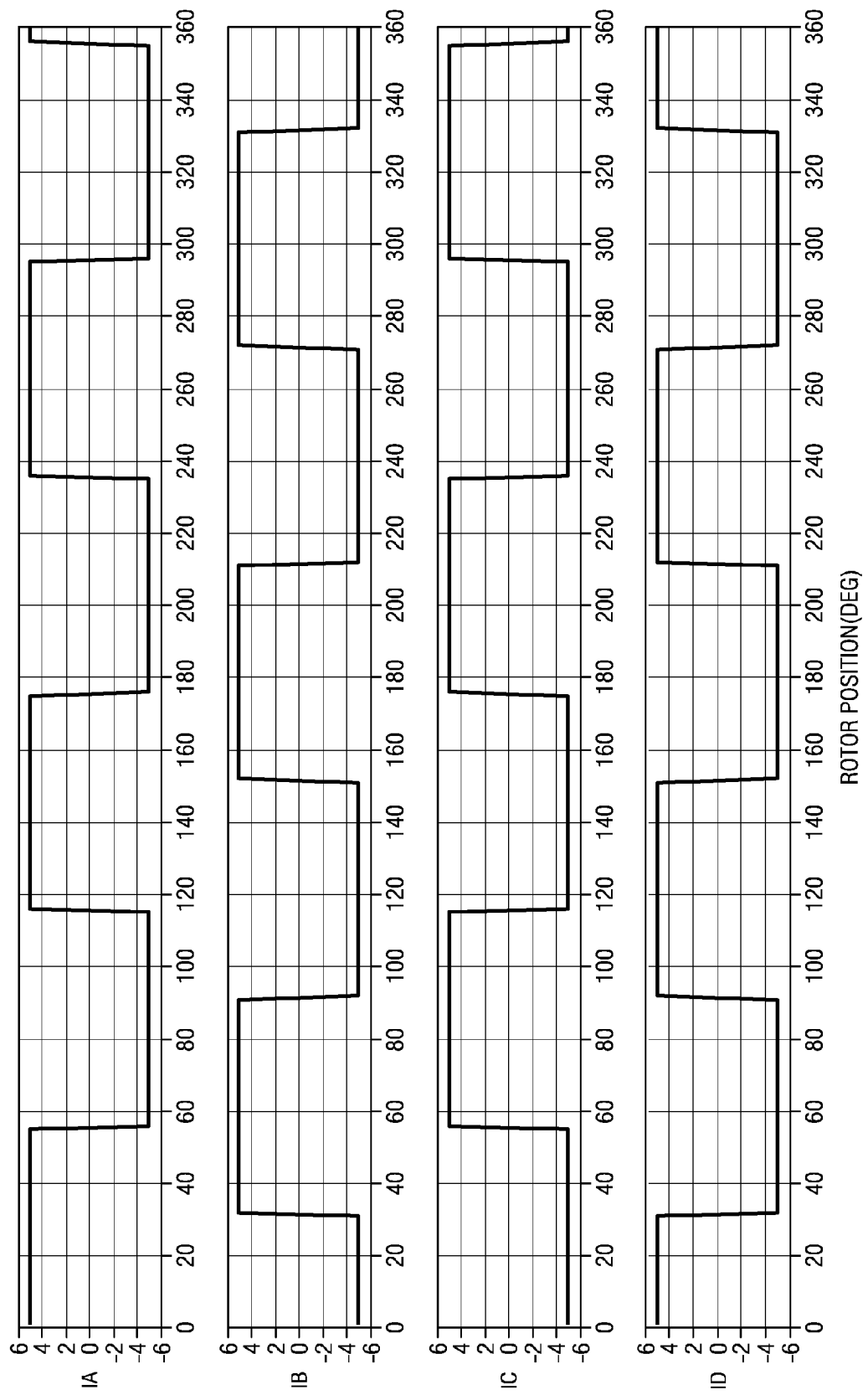
FIG. 23(a) illustrates the optimal current waveforms in the case of an open-circuit fault in phase "D", in accordance with some embodiments.
Figure 23B:
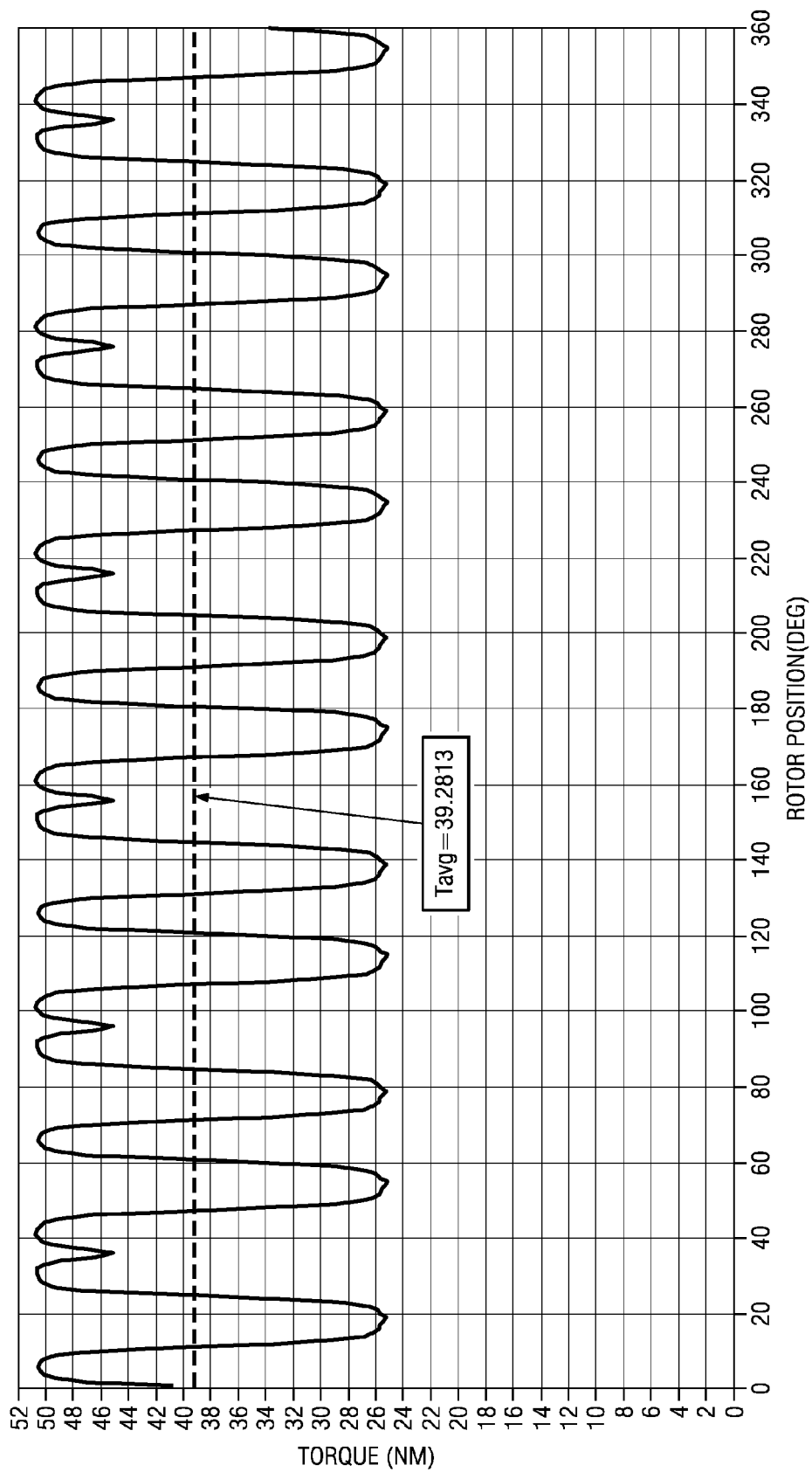
FIG. 23(b) depicts the resulting toque in the case where the optimized currents are applied to the remaining healthy phases, in accordance with some embodiments.

The optimization data is stored in the memory and in case of a fault the optimal currents would be applied to the remaining healthy phases to get the maximum torque per ampere. FIG. 23(a) illustrates the optimal current waveforms in the case of an open-circuit fault in phase "D". FIG. 23(b) depicts the resulting toque in the case where the optimized currents are applied to the remaining healthy phases. The average torque, Tavg, for this case is 39.2813. It can be seen that the average torque is decreased compared to the case of a healthy 5-phase PMSM, but the machine still can continue its operation with the reduced power level. The same analysis can be accomplished for the cases where any other phases are out. However, it is notable that 4-phase operation with optimal excitation generates more torque than 5-phase operation with sinusoidal excitation.

Figure 24A:
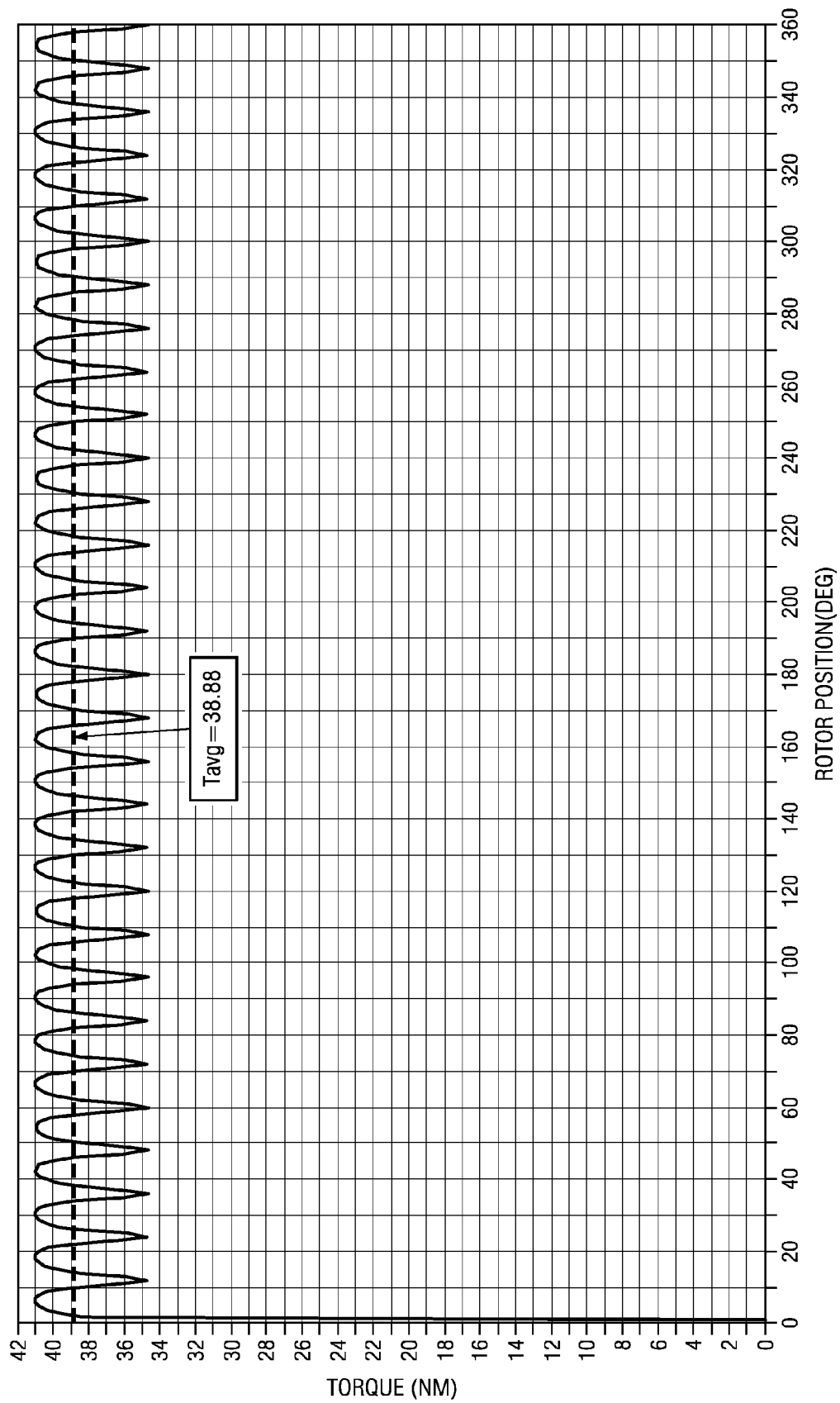
FIGS. 24(a) and (b) show the output mechanical torque of the machine for healthy sinusoidal excitation and partially demagnetized, respectively, in accordance with some embodiments.
Figure 24B:
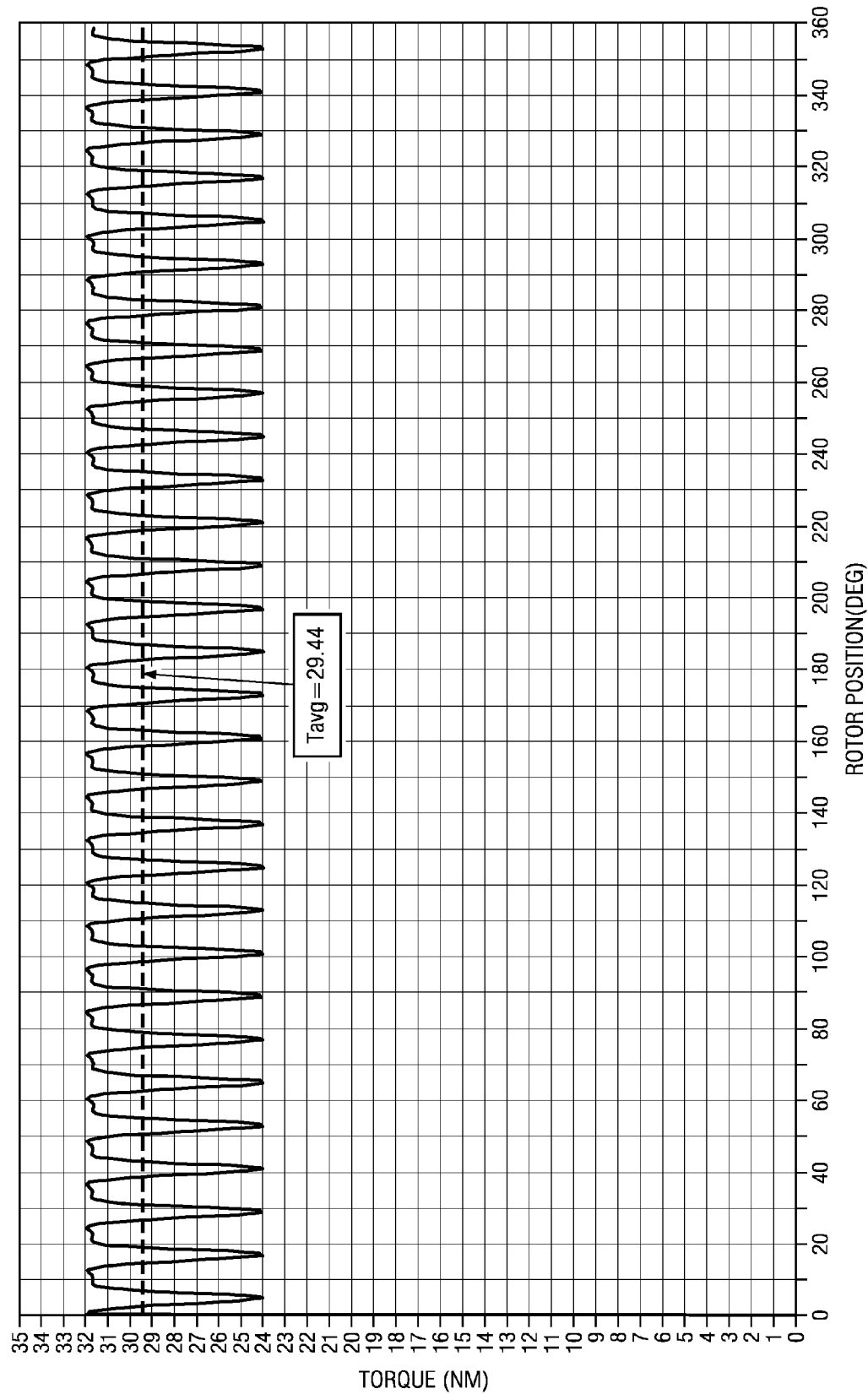
Figure 25A:
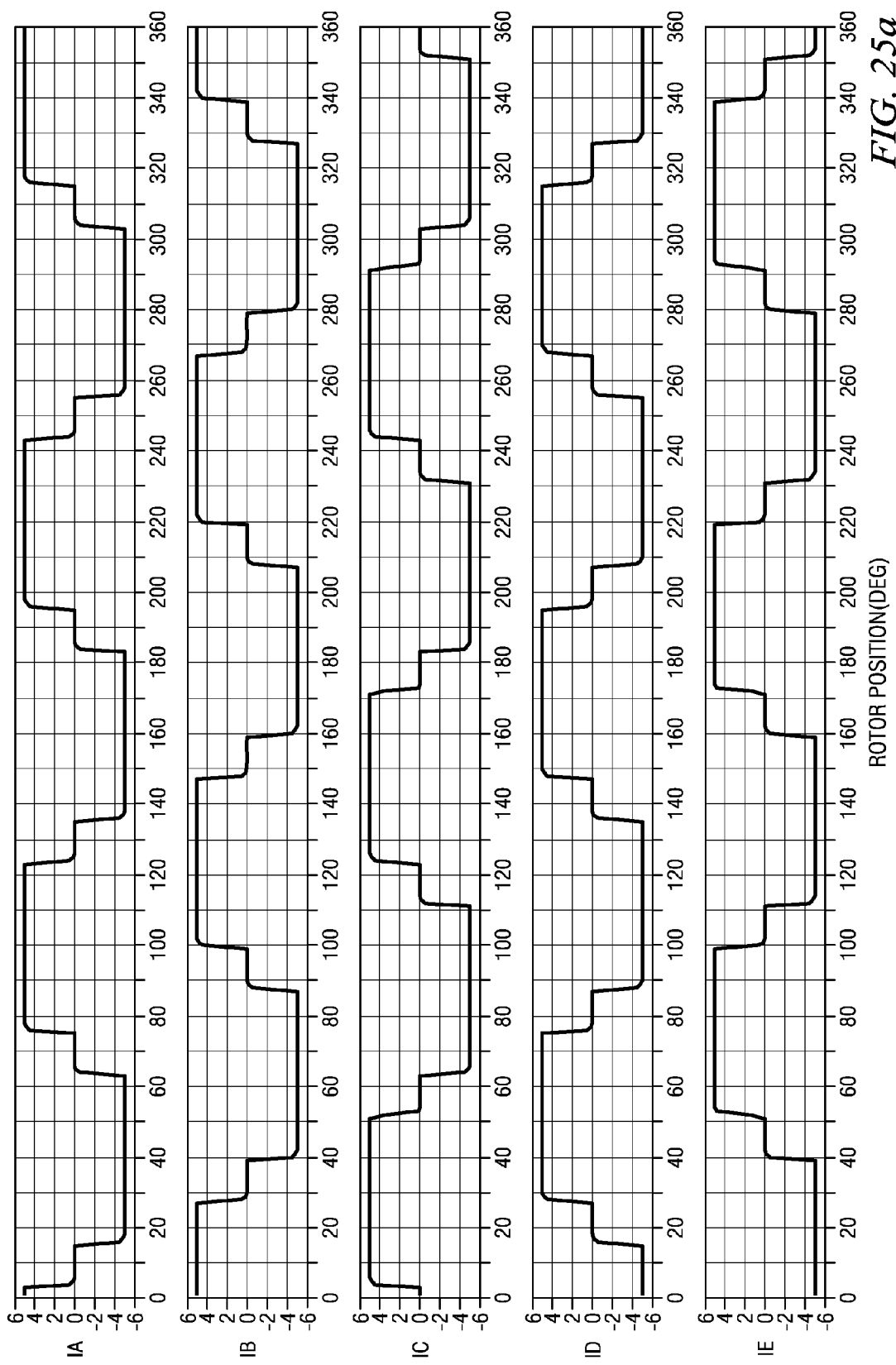
FIGS. 25(a) and (b) depict the optimal stator phase currents and the output torque, respectively, of the machine with partially demagnetized magnets, in accordance with some embodiments.
Figure 25B:
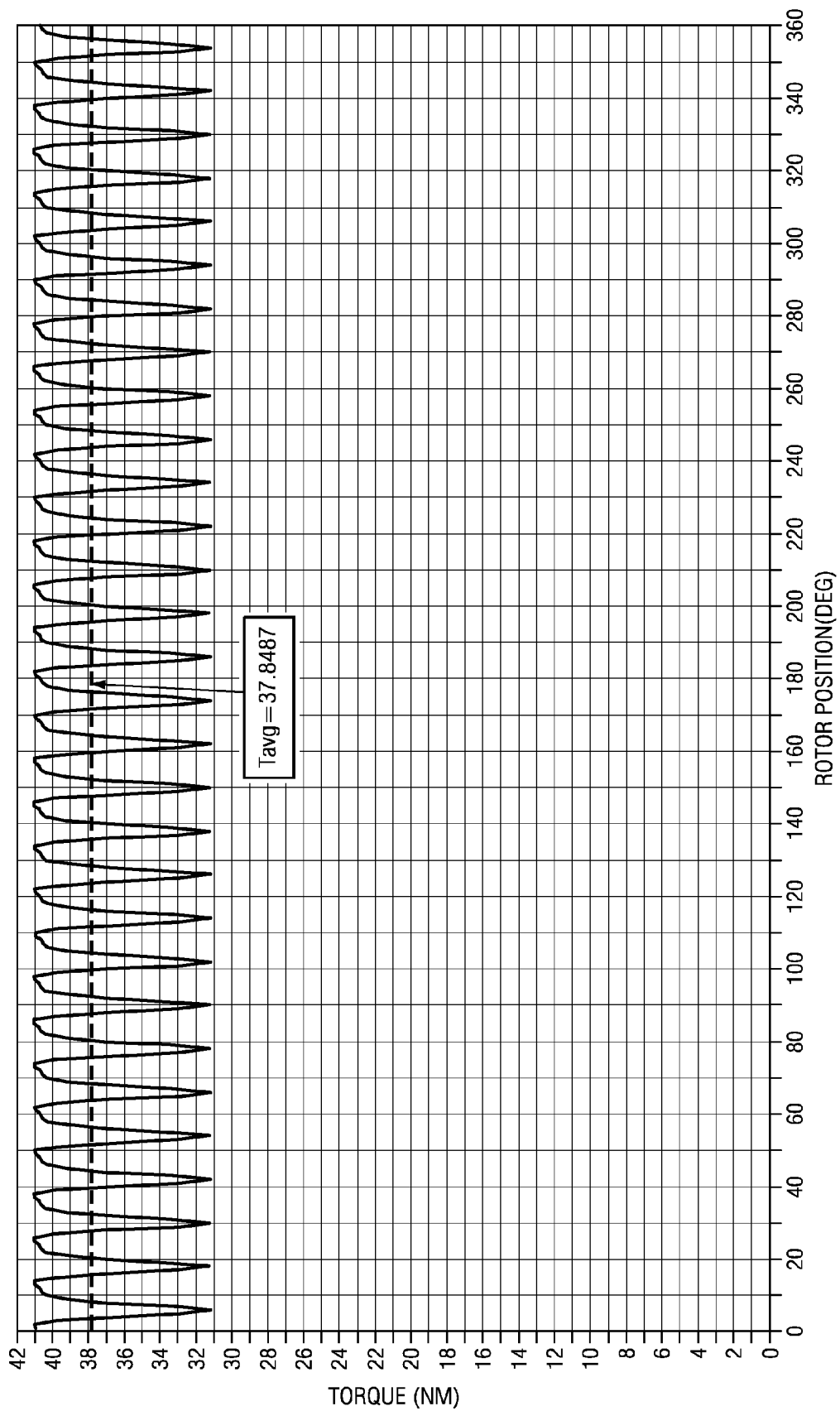

Partial demagnetization treatment: Depending on the service continuity strategy, various scenarios may be deployed after the demagnetization fault is detected. In case the service may be provided by another module, the machine could be stopped and the magnets be replaced. In the case of an emergency application in which service discontinuity is not possible, the stator currents can be modified in a way that the maximum possible average torque could be squeezed out of the machine shaft. Of course the presence of the harmonics in the current would result in extra torque pulsations. For this purpose the field reconstruction method is used in conjunction with the optimization methods to attain the optimal current waveforms. FIGS. 24(a) and (b) show the output mechanical torque of the machine for healthy sinusoidal excitation and partially demagnetized, respectively. For the case of partial demagnetization, the average torque is equal to 29.44 and has decreased almost 25% from the average torque of 38.88 resulting from the machine with healthy sinusoidal excitation. Additionally, torque ripple has increased almost 30%. The MATLAB® optimization toolbox is linked to the FRM code to determine the optimal waveforms. For each rotor position, the optimization code calculates a set of currents based on the optimization criteria. These currents are used to calculate the magnetic field components in the machine. Then, using the magnetic field components, the torque is calculated. In case the calculated torque complies with the target values, the currents are stored and a new rotor position is considered. FIGS. 25(a) and (b) depict the optimal stator phase currents and the output torque, respectively, of the machine with partially demagnetized magnets. The average torque, Tavg, for this case is 37.8487. The optimization criteria may be chosen to achieve maximum average torque, maximum average torque with minimum torque ripple, and minimum torque ripple. In this embodiment, the optimization process is targeted towards the maximum average torque. As can be seen from FIG. 24(a) and FIG. 25(b), the average torque is about 3% less than that of the healthy machine with sinusoidal stator currents and the torque ripple is increased as expected. Different optimization scenarios can be considered and the optimal currents for each case can be achieved and stored in look up tables in the control unit. Based on the application, the appropriate currents may be applied to the stator phases in case the fault is detected.

Figure 26A:
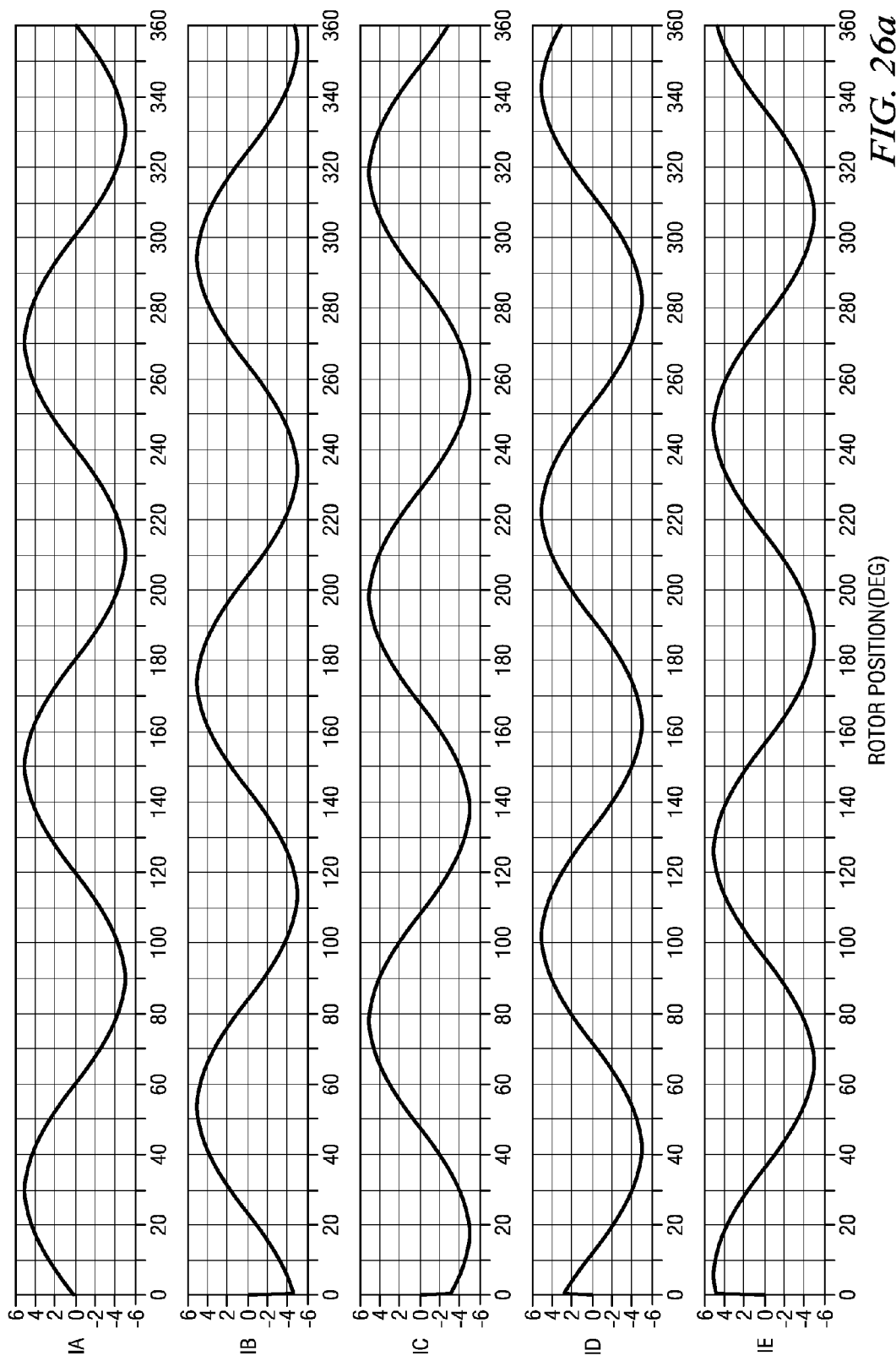
FIGS. 26(a) and (b) depict the sinusoidal excitation stator currents and the corresponding output torque, respectively, for the case with the eccentric rotor, in accordance with some embodiments.
Figure 26B:
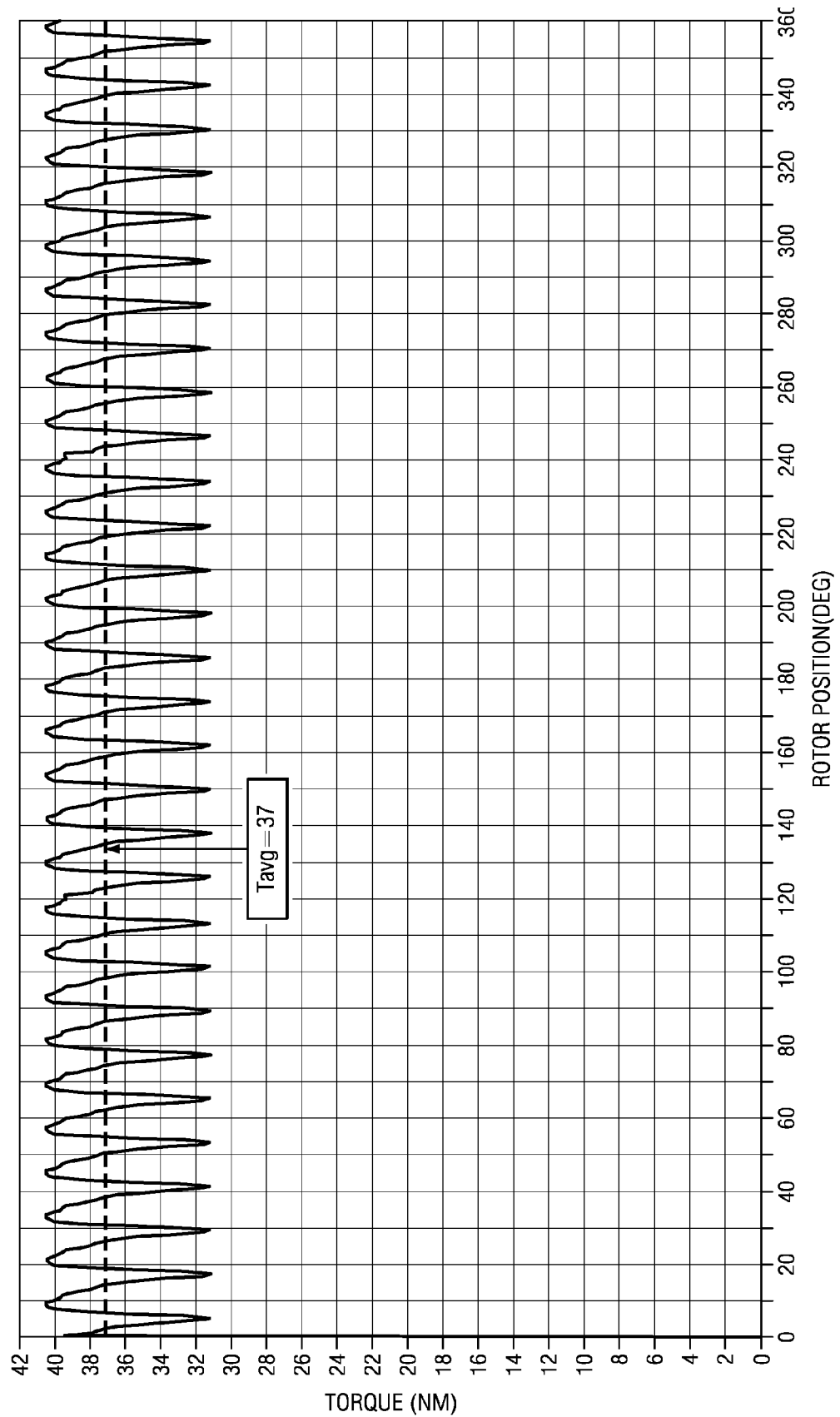
Figure 27A:
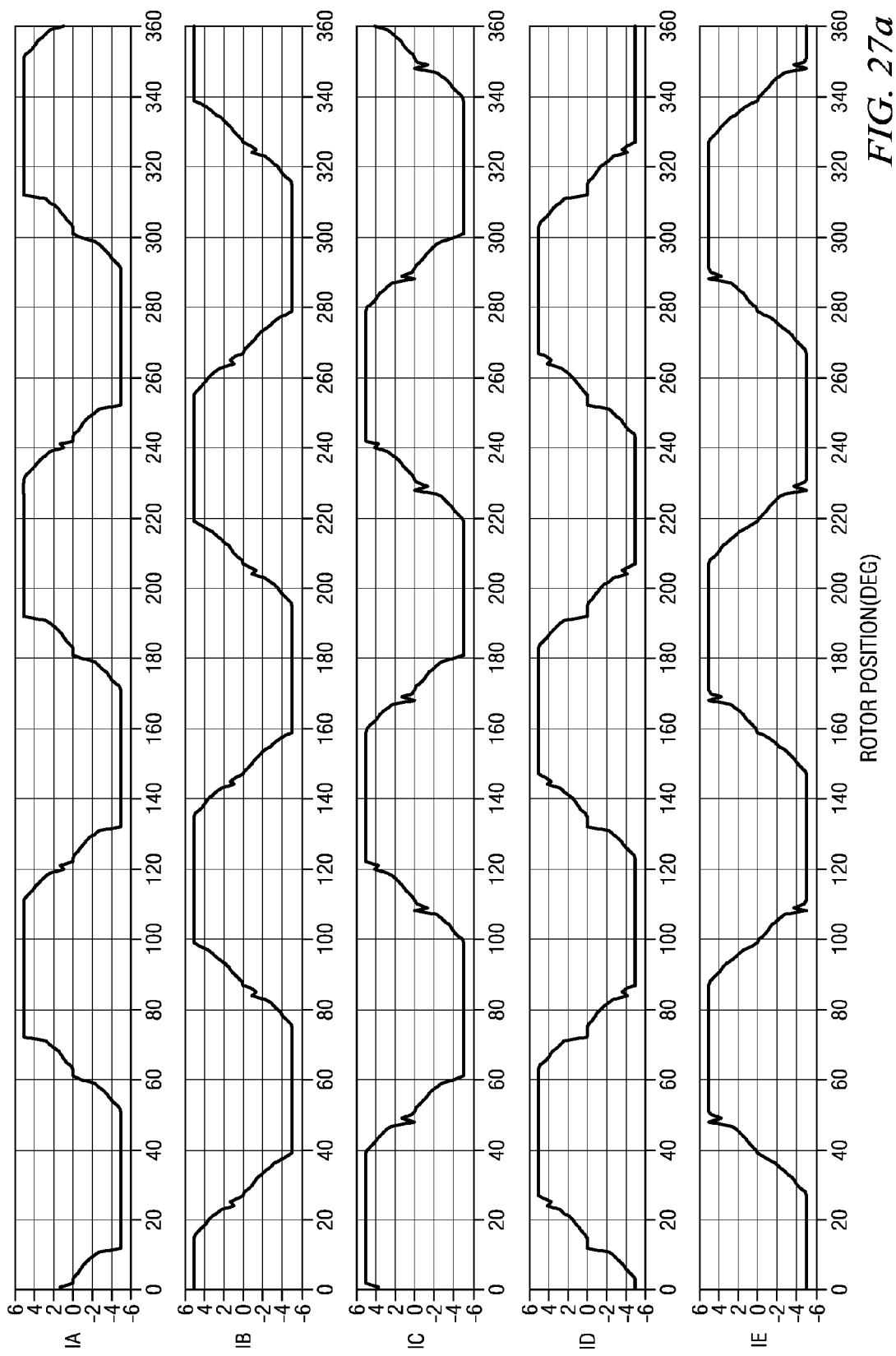
FIGS. 27(a) and (b) depict the optimal stator phase currents and the output torque, respectively, of the machine with an eccentric rotor, in accordance with some embodiments.
Figure 27B:
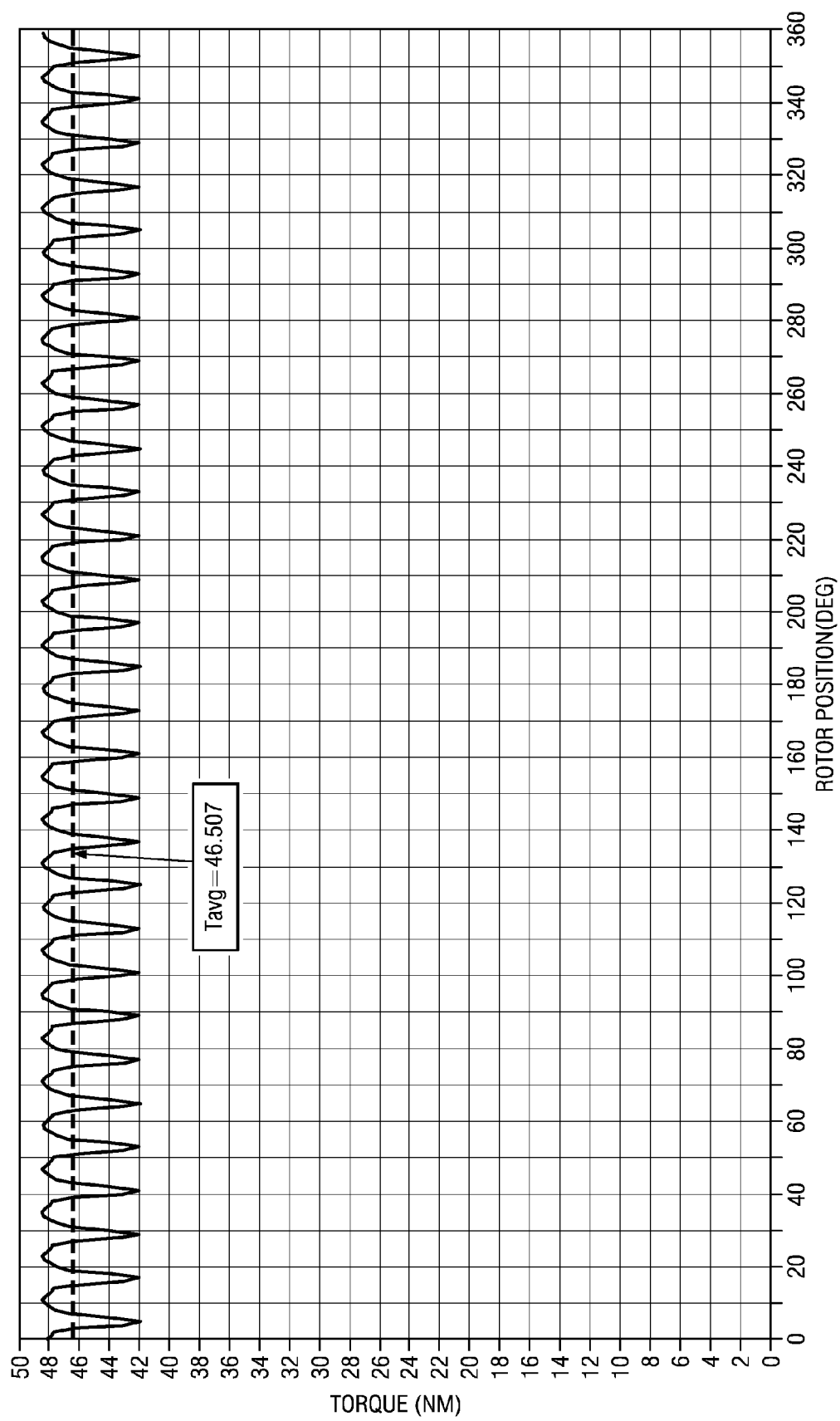

Rotor eccentricity treatment: In this embodiment, the goal is to squeeze the maximum average torque out of the healthy components of the machine. For this purpose the optimal currents for each case of the fault are calculated. To obtain the optimized waveforms the FRM technique is used in conjunction with the MATLAB® optimization toolbox. The optimization criteria which are determined based on the application are specified in the optimization code. The optimization code is linked to FRM. Based on the initial values of the currents estimated in the optimization module, the resulting torque is calculated and compared with the target value. In the case the target is reached, the optimal currents are calculated for a new rotor position. This procedure is implemented for all the faulty cases. FIGS. 26(a) and (b) depict the sinusoidal excitation stator currents and the corresponding output torque, respectively, for the case with the eccentric rotor. The average torque, Tavg, for this case is 37. It may be seen in FIG. 26(b) that the average torque is reduced compared with the healthy machine while the ripple is increased nearly 30%. FIGS. 27(a) and (b) depict the optimal stator phase currents and the output torque, respectively, of the machine with an eccentric rotor. The average torque, Tavg, for this case is 46.507. The optimization criteria are chosen so that the torque ripple is minimized and the average torque is maximized.

Figure 28:
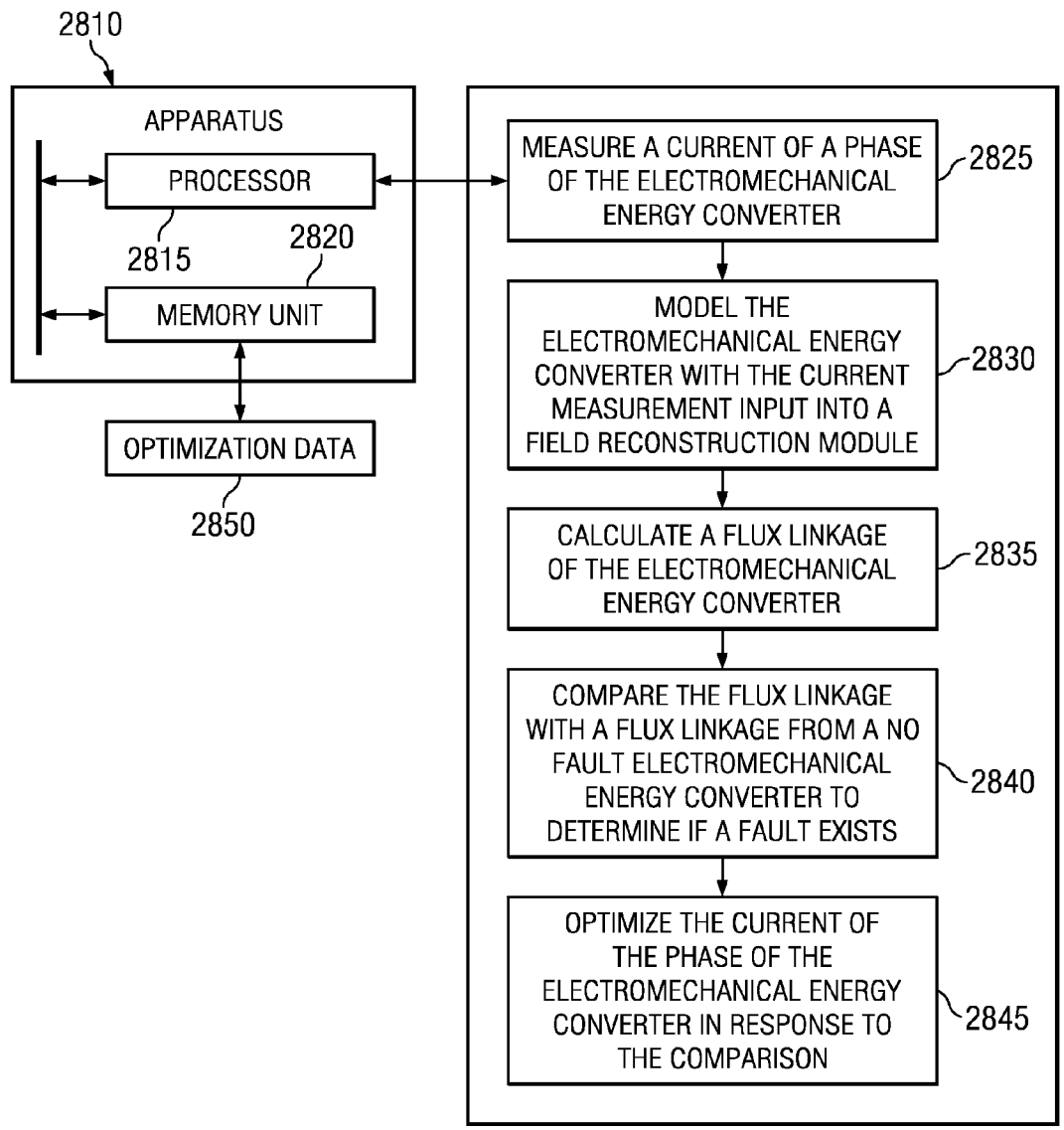
FIG. 28 is a block diagram illustrating an apparatus for detecting faults and optimizing phase currents in an electromechanical energy converter, in accordance with some embodiments.

FIG. 28 is a block diagram illustrating an apparatus for detecting faults and optimizing phase currents in an electromechanical energy converter, in accordance with some embodiments.

In some embodiments, an apparatus 2810 comprises a processor 2815 and memory unit 2820. Processor 2815 is configured to perform computations and general control operations and memory unit 2820 is configured to store the optimization lookup table 2850. The computations and the general control operations of the processor 2815 are to measure a current of a phase of the electromechanical energy converter 2825, model the electromechanical energy converter with the measured current input into a field reconstruction module 2830, calculate a flux linkage of the electromechanical energy converter 2835, compare the flux linkage with a flux linkage from a no fault electromechanical energy converter to determine if a fault exists 2840, and optimize the current of the phase of the electromechanical energy converter in response to the comparison 2845.

In light of the principles and example embodiments described and illustrated herein, it will be recognized that the example embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure also described various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method for detecting faults and optimizing phase currents in an electromechanical energy converter, the method comprising:
    measuring a current of a phase of the electromechanical energy converter;
    modeling the electromechanical energy converter with the current measurement input into a field reconstruction module;
    calculating a flux linkage of the electromechanical energy converter;
    comparing the flux linkage with a flux linkage from a no fault electromechanical energy converter; and
    optimizing the current of the phase of the electromechanical energy converter in response to the comparison.

2. The method of claim 1, further comprising simultaneously detecting faults and optimizing phase currents in all the phases of the electromechanical energy converter.

3. The method of claim 1, wherein the electromechanical energy converter comprises a permanent magnet synchronous machine.

4. The method of claim 3, wherein calculating the flux linkage of the electromechanical energy converter comprises:
    finding magnetic field components due to the permanent magnets and the stator excitation in the middle of the airgap of the permanent magnet synchronous machine; and
    finding the contribution of the magnetic field components passing through the stator tooth of the permanent magnet synchronous machine.

5. The method of claim 4, wherein finding the contribution of the magnetic field components passing through the stator tooth of the permanent magnet synchronous machine is calculated according to the equation of:

$$B_{proj}(j) = \sum_{i=1}^{K} \{B_{n,i}\cos(\phi_i - \theta_j) - B_{t,i}\sin(\phi_i - \theta_j)\}$$

where $B_{proj}(j)$ is the projected field contribution of the magnetic field components passing through the stator tooth; $B_{n,i}$ is the normal component of the magnetic field density; $B_{t,i}$ is the tangential component of the magnetic field density; $\phi_i$ are the positions of the field components in the air gap; i=1 ... K is the number of field components solutions in the airgap covering one stator tooth; $\phi_j$ are the positions of the magnetic field projection axes; and j is the respective stator tooth order.

6. The method of claim 3, wherein modeling the electromechanical energy converter with the current measurement input into a field reconstruction module comprises:
    obtaining a normal flux density distribution at a rotor position due to the permanent magnet of the permanent magnet synchronous machine;
    obtaining a tangential flux density distribution at the rotor position due to the permanent magnet of the permanent magnet synchronous machine;
    reconstructing a flux density due to all the phases of the permanent magnet synchronous machine;
    reconstructing the flux density in a layer of interest; and
    repeating the modeling for all positions of the rotor of the permanent magnet synchronous machine.

7. The method of claim 1, wherein optimizing the current of the phase of the electromechanical energy converter in response to the comparison comprises maximizing average torque, maximizing average torque with minimum torque ripple, or minimizing torque ripple.

8. An apparatus for detecting faults and optimizing phase currents in an electromechanical energy converter, the apparatus comprising:
    one or more processors; and
    one or more memory units coupled to the processors,
    the apparatus being configured to:
        measure a current of a phase of the electromechanical energy converter;
        model the electromechanical energy converter with the current measurement input into a field reconstruction module;
        calculate a flux linkage of the electromechanical energy converter;
        compare the flux linkage with a flux linkage from a no fault electromechanical energy converter; and
        optimize the current of the phase of the electromechanical energy converter in response to the comparison.

9. The apparatus of claim 8, wherein the apparatus is further configured to simultaneously detect faults and optimize phase currents in all the phases of the electromechanical energy converter.

10. The apparatus of claim 8, wherein the electromechanical energy converter comprises a permanent magnet synchronous machine.

11. The apparatus of claim 10, wherein the apparatus being configured to calculate the flux linkage of the electromechanical energy converter comprises:
    finding magnetic field components due to the permanent magnets and the stator excitation in the middle of the airgap of the permanent magnet synchronous machine; and
    finding the contribution of the magnetic field components passing through the stator tooth of the permanent magnet synchronous machine.

12. The apparatus of claim 11, wherein finding the contribution of the magnetic field components passing through the stator tooth of the permanent magnet synchronous machine is calculated according to the equation of:

$$B_{proj}(j) = \sum_{i=1}^{K} \{B_{n,i}\cos(\phi_i - \theta_j) - B_{t,i}\sin(\phi_i - \theta_j)\}$$

where $B_{proj}(j)$ is the projected field contribution of the magnetic field components passing through the stator tooth; $B_{n,i}$ is the normal component of the magnetic field density; $B_{t,i}$ the tangential component of the magnetic field density; $\phi_i$ are the positions of the field components in the air gap; $i=1 \ldots K$ is the number of field components solutions in the airgap covering one stator tooth; $\theta_j$ are the positions of the magnetic field projection axes; and j is the respective stator tooth order.

13. The apparatus of claim 10, wherein the apparatus being configured to model the electromechanical energy converter with the current measurement input into a field reconstruction module comprises:

obtaining a normal flux density distribution at a rotor position due to the permanent magnet of the permanent magnet synchronous machine;

obtaining a tangential flux density distribution at the rotor position due to the permanent magnet of the permanent magnet synchronous machine;

reconstructing a flux density due to all the phases of the permanent magnet synchronous machine;

reconstructing the flux density in a layer of interest; and repeating the modeling for all positions of the rotor of the permanent magnet synchronous machine.

14. The apparatus of claim 8, wherein the apparatus being configured to optimize the current of the phase of the electromechanical energy converter in response to the comparison comprises maximizing average torque, maximizing average torque with minimum torque ripple, or minimizing torque ripple.

* * * * *